(12) United States Patent
Mittricker et al.

(10) Patent No.: US 9,399,950 B2
(45) Date of Patent: Jul. 26, 2016

(54) SYSTEMS AND METHODS FOR EXHAUST GAS EXTRACTION

(75) Inventors: Franklin F. Mittricker, Jamul, CA (US); Richard A. Huntington, Houston, TX (US); Dennis M. O'Dea, Somerset, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 508 days.

(21) Appl. No.: 13/704,925

(22) PCT Filed: Jun. 27, 2011

(86) PCT No.: PCT/US2011/042019
§ 371 (c)(1),
(2), (4) Date: Dec. 17, 2012

(87) PCT Pub. No.: WO2012/018458
PCT Pub. Date: Feb. 9, 2012

(65) Prior Publication Data
US 2013/0125554 A1  May 23, 2013

Related U.S. Application Data

(60) Provisional application No. 61/371,527, filed on Aug. 6, 2010.

(51) Int. Cl.
*F02C 3/34* (2006.01)
*F01K 23/10* (2006.01)
(Continued)

(52) U.S. Cl.
CPC . *F02C 3/34* (2013.01); *F01K 23/10* (2013.01); *F23C 9/00* (2013.01); *F23R 3/00* (2013.01); *Y02E 20/16* (2013.01)

(58) Field of Classification Search
CPC ................ F02C 7/08; F02C 7/12; F02C 3/30; F02C 3/305; F02C 3/34; F02C 1/00; F02C 1/005; F02C 1/08
USPC .......................................... 60/737–748, 39.52
See application file for complete search history.

(56) References Cited

U.S. PATENT DOCUMENTS

| 3,705,492 A | 12/1972 | Vickers ........................ 60/39.51 |
| 3,841,382 A | 10/1974 | Gravis, III et al. .......... 159/16 R |

(Continued)

FOREIGN PATENT DOCUMENTS

| CA | 2231749 | 3/1998 | ................ F23C 9/00 |
| CA | 2550675 | 7/2005 | ................ F02C 3/34 |

(Continued)

OTHER PUBLICATIONS

Ahmed, S. et al. (1998) "Catalytic Partial Oxidation Reforming of Hydrocarbon Fuels," *1998 Fuel Cell Seminar*, Nov. 16-19, 1998, 7 pgs.

(Continued)

*Primary Examiner* — Craig Kim
(74) *Attorney, Agent, or Firm* — ExxonMobil Upstream Research Company Law Department

(57) ABSTRACT

The present techniques are directed to a combustor for a gas turbine. For example, an embodiment provides a spool piece for the combustor. The spool piece includes an oxidant injection port configured for injection of an oxidant proximate to a flame in the combustor and a recycle-gas extraction port configured for an extraction of a recycle gas from the combustor, wherein the recycle gas is isolated from the oxidant prior to the use of the oxidant in a flame.

21 Claims, 9 Drawing Sheets

(51) Int. Cl.
*F23C 9/00* (2006.01)
*F23R 3/00* (2006.01)

(56) References Cited

U.S. PATENT DOCUMENTS

| | | | | |
|---|---|---|---|---|
| 4,043,395 A | 8/1977 | Every et al. | | 166/263 |
| 4,050,239 A | 9/1977 | Kappler et al. | | 60/39.51 |
| 4,160,640 A | 7/1979 | Maev et al. | | 431/9 |
| 4,171,349 A | 10/1979 | Cucuiat et al. | | 423/574 |
| 4,271,664 A | 6/1981 | Earnest | | 60/39.18 |
| 4,344,486 A | 8/1982 | Parrish | | 166/272 |
| 4,414,334 A | 11/1983 | Hitzman | | 435/262 |
| 4,434,613 A | 3/1984 | Stahl | | 60/39.7 |
| 4,498,289 A | 2/1985 | Osgerby | | 60/39.52 |
| 4,753,666 A | 6/1988 | Pastor et al. | | 62/24 |
| 4,762,543 A | 8/1988 | Pantermuehl et al. | | 62/28 |
| 4,858,428 A | 8/1989 | Paul | | 60/39.17 |
| 4,895,710 A | 1/1990 | Hartmann et al. | | 423/351 |
| 4,976,100 A | 12/1990 | Lee | | 60/39.02 |
| 5,014,785 A | 5/1991 | Puri et al. | | 166/263 |
| 5,085,274 A | 2/1992 | Puri et al. | | 166/252 |
| 5,123,248 A | 6/1992 | Monty et al. | | 60/740 |
| 5,141,049 A | 8/1992 | Larsen et al. | | 165/133 |
| 5,147,111 A | 9/1992 | Montgomery | | 299/16 |
| 5,332,036 A | 7/1994 | Shirley et al. | | 166/268 |
| 5,345,756 A | 9/1994 | Jahnke et al. | | 60/39.02 |
| 5,388,395 A | 2/1995 | Scharpf et al. | | 60/39.02 |
| 5,402,847 A | 4/1995 | Wilson et al. | | 166/263 |
| 5,444,971 A | 8/1995 | Holenbrger | | 60/39.02 |
| 5,490,378 A | 2/1996 | Berger et al. | | 60/39.23 |
| 5,566,756 A | 10/1996 | Chaback et al. | | 166/263 |
| 5,724,805 A | 3/1998 | Golomb et al. | | 60/39.02 |
| 5,725,054 A | 3/1998 | Shayegi et al. | | 166/263 |
| 5,901,547 A | 5/1999 | Smith et al. | | 60/39.02 |
| 5,968,349 A | 10/1999 | Duyvesteyn et al. | | 208/390 |
| 6,082,093 A | 7/2000 | Greenwood et al. | | 60/39.23 |
| 6,089,855 A | 7/2000 | Becker et al. | | 431/9 |
| 6,148,602 A | 11/2000 | Demetri | | 60/39.05 |
| 6,201,029 B1 | 3/2001 | Waycuilis | | 518/703 |
| 6,202,400 B1 | 3/2001 | Utamura et al. | | 60/39.03 |
| 6,256,994 B1 | 7/2001 | Dillon | | 60/649 |
| 6,263,659 B1 | 7/2001 | Dillon | | 60/39.02 |
| 6,282,901 B1 | 9/2001 | Marin et al. | | 60/649 |
| 6,298,652 B1 | 10/2001 | Mittricker et al. | | 60/39.02 |
| 6,298,654 B1 | 10/2001 | Vermes et al. | | 60/39.02 |
| 6,298,664 B1 | 10/2001 | Asen et al. | | 60/649 |
| 6,332,313 B1 | 12/2001 | Willis et al. | | 60/39.06 |
| 6,345,493 B1 | 2/2002 | Smith et al. | | 60/39.02 |
| 6,374,594 B1 | 4/2002 | Kraft et al. | | 60/39.37 |
| 6,389,814 B2 | 5/2002 | Viteri et al. | | 60/716 |
| 6,405,536 B1 | 6/2002 | Ho et al. | | 60/742 |
| 6,412,559 B1 | 7/2002 | Gunter et al. | | 166/271 |
| 6,450,256 B2 | 9/2002 | Mones | | 166/250.01 |
| 6,477,859 B2 | 11/2002 | Wong et al. | | 62/617 |
| 6,508,209 B1 | 1/2003 | Collier | | 123/3 |
| 6,598,402 B2 | 7/2003 | Kataoka et al. | | 60/775 |
| 6,637,183 B2 | 10/2003 | Viteri et al. | | 60/39.182 |
| 6,655,150 B1 | 12/2003 | Åsen et al. | | 60/772 |
| 6,702,570 B2 | 3/2004 | Shah et al. | | 431/11 |
| 6,722,436 B2 | 4/2004 | Krill | | 166/303 |
| 6,745,573 B2 | 6/2004 | Marin et al. | | 60/775 |
| 6,790,030 B2 | 9/2004 | Fischer et al. | | 431/8 |
| 6,907,737 B2 | 6/2005 | Mittricker et al. | | 60/772 |
| 6,910,335 B2 | 6/2005 | Viteri et al. | | 60/786 |
| 6,945,029 B2 | 9/2005 | Viteri | | 60/39.17 |
| 7,043,920 B2 | 5/2006 | Viteri et al. | | 60/716 |
| 7,065,953 B1 | 6/2006 | Kopko | | 60/39.3 |
| 7,089,743 B2 | 8/2006 | Frutschi et al. | | 60/772 |
| 7,124,589 B2 | 10/2006 | Neary | | 60/784 |
| 7,143,572 B2 | 12/2006 | Ooka et al. | | 60/39.182 |
| 7,147,461 B2 | 12/2006 | Neary | | 431/5 |
| 7,284,362 B2 | 10/2007 | Marin et al. | | 60/39.182 |
| 7,305,831 B2 | 12/2007 | Carrea et al. | | 60/772 |
| 7,357,857 B2 | 4/2008 | Hart et al. | | 208/391 |
| 7,363,756 B2 | 4/2008 | Carrea et al. | | 60/39.52 |
| 7,401,577 B2 | 7/2008 | Saucedo et al. | | 122/448.1 |
| 7,472,550 B2 | 1/2009 | Lear et al. | | 62/238.3 |
| 7,481,275 B2 | 1/2009 | Olsvik et al. | | 166/303 |
| 7,490,472 B2 * | 2/2009 | Lynghjem et al. | | 60/772 |
| 7,491,250 B2 | 2/2009 | Hershkowitz et al. | | 48/198.7 |
| 7,503,178 B2 | 3/2009 | Bucker et al. | | 60/774 |
| 7,516,626 B2 | 4/2009 | Brox et al. | | 62/643 |
| 7,536,873 B2 | 5/2009 | Nohlen | | 62/644 |
| 7,559,977 B2 | 7/2009 | Fleischer et al. | | 95/236 |
| 7,566,394 B2 | 7/2009 | Koseoglu | | 208/309 |
| 7,637,093 B2 | 12/2009 | Rao | | 60/39.52 |
| 7,650,744 B2 | 1/2010 | Varatharajan et al. | | 60/39.12 |
| 7,654,320 B2 | 2/2010 | Payton | | 166/257 |
| 7,752,848 B2 | 7/2010 | Balan et al. | | 60/780 |
| 7,752,850 B2 | 7/2010 | Laster et al. | | 60/794 |
| 7,762,084 B2 | 7/2010 | Martis et al. | | 60/792 |
| 7,765,810 B2 | 8/2010 | Pfefferle | | 60/777 |
| 2001/0015061 A1 | 8/2001 | Viteri et al. | | 60/39.161 |
| 2002/0036086 A1 | 3/2002 | Minkkinen et al. | | 166/266 |
| 2002/0162333 A1 * | 11/2002 | Zelina | | 60/776 |
| 2002/0166323 A1 | 11/2002 | Marin et al. | | 60/775 |
| 2003/0000436 A1 | 1/2003 | Havlena | | 110/347 |
| 2003/0131582 A1 | 7/2003 | Anderson et al. | | 60/39.55 |
| 2003/0134241 A1 | 7/2003 | Marin et al. | | 431/9 |
| 2003/0221409 A1 | 12/2003 | McGowan | | 60/39.17 |
| 2003/0235529 A1 | 12/2003 | Hershkowitz et al. | | 423/652 |
| 2004/0128975 A1 | 7/2004 | Viteri | | 60/39.55 |
| 2004/0148941 A1 | 8/2004 | Wylie | | 60/772 |
| 2004/0154793 A1 | 8/2004 | Zapadinski | | 166/256 |
| 2004/0170558 A1 | 9/2004 | Hershkowitz | | 423/652 |
| 2004/0170559 A1 | 9/2004 | Hershkowitz et al. | | 423/652 |
| 2004/0175326 A1 | 9/2004 | Hershkowitz et al. | | 423/652 |
| 2004/0180973 A1 | 9/2004 | Hershkowitz | | 518/703 |
| 2004/0191166 A1 | 9/2004 | Hershkowitz et al. | | 423/652 |
| 2004/0206091 A1 | 10/2004 | Yee et al. | | 60/777 |
| 2004/0219079 A1 | 11/2004 | Hagen et al. | | 422/194 |
| 2004/0241505 A1 | 12/2004 | Hershkowitz et al. | | 429/17 |
| 2005/0022499 A1 | 2/2005 | Belokon et al. | | 60/39.511 |
| 2005/0028529 A1 | 2/2005 | Bartlett et al. | | 60/772 |
| 2005/0123874 A1 | 6/2005 | Abbasi et al. | | 431/351 |
| 2005/0132713 A1 | 6/2005 | Neary | | 60/784 |
| 2005/0137269 A1 | 6/2005 | Hershkowitz et al. | | 518/702 |
| 2005/0144961 A1 | 7/2005 | Colibaba-Evulet et al. | | 60/780 |
| 2005/0154068 A1 | 7/2005 | Hershkowitz et al. | | 518/703 |
| 2005/0186130 A1 | 8/2005 | Hughes et al. | | 423/219 |
| 2005/0197267 A1 | 9/2005 | Zaki et al. | | 510/245 |
| 2005/0201929 A1 | 9/2005 | Hershkowitz et al. | | 423/652 |
| 2005/0236602 A1 | 10/2005 | Viteri et al. | | 252/372 |
| 2006/0005542 A1 | 1/2006 | Campbell et al. | | 60/723 |
| 2006/0112696 A1 | 6/2006 | Lynghjem et al. | | 60/772 |
| 2006/0127827 A1 | 6/2006 | Yoshida et al. | | 431/8 |
| 2006/0183009 A1 | 8/2006 | Berlowitz et al. | | 429/19 |
| 2006/0188760 A1 | 8/2006 | Hershkowitz et al. | | 429/17 |
| 2006/0196812 A1 | 9/2006 | Beetge et al. | | 208/435 |
| 2006/0231252 A1 | 10/2006 | Shaw et al. | | 166/272.3 |
| 2006/0260290 A1 | 11/2006 | Rao | | 60/39.53 |
| 2007/0006565 A1 | 1/2007 | Fleischer et al. | | 60/39.5 |
| 2007/0034171 A1 | 2/2007 | Griffin et al. | | 122/479.1 |
| 2007/0044479 A1 | 3/2007 | Brandt et al. | | 60/783 |
| 2007/0125063 A1 | 6/2007 | Evulat | | 60/39.15 |
| 2007/0130957 A1 | 6/2007 | Hoffmann et al. | | 60/780 |
| 2007/0144747 A1 | 6/2007 | Steinberg | | 166/402 |
| 2007/0144940 A1 | 6/2007 | Hershkowitz et al. | | 208/107 |
| 2007/0178035 A1 | 8/2007 | White et al. | | 423/248 |
| 2007/0220864 A1 | 9/2007 | Haugen | | 60/286 |
| 2007/0227156 A1 | 10/2007 | Saito et al. | | 60/772 |
| 2007/0237696 A1 | 10/2007 | Payton | | 423/228 |
| 2007/0240425 A1 | 10/2007 | Malavasi et al. | | 60/775 |
| 2007/0245736 A1 | 10/2007 | Barnicki | | 60/670 |
| 2007/0249738 A1 | 10/2007 | Haynes et al. | | 518/702 |
| 2007/0272201 A1 | 11/2007 | Amano et al. | | 123/295 |
| 2007/0295640 A1 | 12/2007 | Tan et al. | | 208/22 |
| 2008/0006561 A1 | 1/2008 | Moran et al. | | 208/45 |
| 2008/0010967 A1 | 1/2008 | Griffin et al. | | 60/39.182 |
| 2008/0016868 A1 | 1/2008 | Ochs et al. | | 60/688 |
| 2008/0038598 A1 | 2/2008 | Berlowitz et al. | | 429/17 |
| 2008/0066443 A1 | 3/2008 | Frutschi et al. | | 60/39.53 |
| 2008/0083226 A1 | 4/2008 | Joshi et al. | | 60/772 |
| 2008/0092539 A1 | 4/2008 | Marshall et al. | | 60/599 |

(56) References Cited

U.S. PATENT DOCUMENTS

| | | | | |
|---|---|---|---|---|
| 2008/0104938 A1 | 5/2008 | Finkenrath et al. | | 60/39.5 |
| 2008/0104939 A1 | 5/2008 | Hoffman et al. | | 60/39.5 |
| 2008/0104958 A1 | 5/2008 | Finkenrath et al. | | 60/605.2 |
| 2008/0115495 A1 | 5/2008 | Rising | | 60/731 |
| 2008/0118310 A1 | 5/2008 | Graham | | 405/129.95 |
| 2008/0127632 A1 | 6/2008 | Finkenrath et al. | | 60/274 |
| 2008/0141643 A1 | 6/2008 | Varatharajan et al. | | 60/39.5 |
| 2008/0142409 A1 | 6/2008 | Sankaranarayanan et al. | | 208/62 |
| 2008/0155984 A1 | 7/2008 | Liu et al. | | 60/649 |
| 2008/0173584 A1 | 7/2008 | White et al. | | 210/656 |
| 2008/0275278 A1 | 11/2008 | Clark | | 585/240 |
| 2008/0290719 A1 | 11/2008 | Kaminsky et al. | | 299/3 |
| 2008/0302107 A1 | 12/2008 | Fan et al. | | 60/783 |
| 2008/0309087 A1 | 12/2008 | Evulet et al. | | 290/52 |
| 2008/0317651 A1 | 12/2008 | Hooper et al. | | 423/230 |
| 2009/0038247 A1 | 2/2009 | Taylor et al. | | 52/287.1 |
| 2009/0064653 A1 | 3/2009 | Hagen et al. | | 60/39.3 |
| 2009/0100754 A1 | 4/2009 | Gil | | 48/201 |
| 2009/0117024 A1 | 5/2009 | Weedon et al. | | 423/437.1 |
| 2009/0133400 A1 | 5/2009 | Callas | | 60/730 |
| 2009/0145127 A1 | 6/2009 | Vollmer et al. | | 60/618 |
| 2009/0193809 A1 | 8/2009 | Schroder et al. | | 60/762 |
| 2009/0194280 A1 | 8/2009 | Gil et al. | | 166/267 |
| 2009/0205334 A1 | 8/2009 | Aljabari et al. | | 60/605.2 |
| 2009/0218821 A1 | 9/2009 | ElKady et al. | | 290/52 |
| 2009/0235671 A1 | 9/2009 | Rabovitser et al. | | 60/806 |
| 2009/0241506 A1 | 10/2009 | Nilsson | | 60/39.24 |
| 2009/0250264 A1 | 10/2009 | Dupriest | | 175/40 |
| 2009/0284013 A1 | 11/2009 | Anand et al. | | 290/52 |
| 2009/0301054 A1 | 12/2009 | Simpson et al. | | 60/39.15 |
| 2009/0301099 A1 | 12/2009 | Nigro | | 60/775 |
| 2010/0018218 A1 | 1/2010 | Riley et al. | | 60/783 |
| 2010/0028142 A1 | 2/2010 | Hashimoto et al. | | 415/200 |
| 2010/0064855 A1 | 3/2010 | Lanyi et al. | | 75/458 |
| 2010/0077941 A1 | 4/2010 | D'Agostini | | 110/188 |
| 2010/0115960 A1 | 5/2010 | Brautsch et al. | | 60/772 |
| 2010/0126176 A1 | 5/2010 | Kim | | 60/748 |
| 2010/0162703 A1 | 7/2010 | Li et al. | | 60/670 |
| 2010/0180565 A1 | 7/2010 | Draper | | 60/39.52 |
| 2010/0310439 A1 | 12/2010 | Brok et al. | | 423/222 |
| 2010/0314136 A1 | 12/2010 | Zubrin et al. | | 166/402 |
| 2010/0326084 A1 | 12/2010 | Anderson et al. | | 60/775 |
| 2011/0000221 A1 | 1/2011 | Minta et al. | | 60/783 |
| 2011/0023488 A1 | 2/2011 | Fong et al. | | 60/659 |
| 2011/0027018 A1 | 2/2011 | Baker et al. | | 405/128.6 |
| 2011/0219777 A1 | 9/2011 | Wijmans et al. | | 60/772 |

FOREIGN PATENT DOCUMENTS

| | | | | |
|---|---|---|---|---|
| CA | 2645450 | 9/2007 | | C01G 1/00 |
| CA | 2614669 | 12/2008 | | B03B 9/02 |
| EP | 0453059 | 6/1994 | | F01K 23/06 |
| EP | 0654639 | 9/1998 | | F23R 3/14 |
| GB | 2117053 | 2/1983 | | F02C 3/22 |
| GB | 2397349 | 7/2004 | | F02C 3/22 |
| WO | WO95/21683 | 8/1995 | | B01D 53/14 |
| WO | WO97/07329 | 2/1997 | | F02C 6/00 |
| WO | WO99/06674 | 2/1999 | | F01K 23/10 |
| WO | WO99/63210 | 12/1999 | | F02C 3/34 |
| WO | WO2005/064232 | 7/2005 | | F23C 6/04 |
| WO | WO2006/107209 | 10/2006 | | F01K 23/00 |
| WO | WO2007/068682 | 6/2007 | | E21B 43/16 |
| WO | WO2008/074980 | 6/2008 | | C01B 3/38 |
| WO | WO2008/097303 | 8/2008 | | |
| WO | WO2008/155242 | 12/2008 | | F02C 3/34 |
| WO | WO2009/120779 | 10/2009 | | F02B 17/00 |
| WO | WO2009/121008 | 10/2009 | | B01J 15/00 |
| WO | WO2009/155062 | 12/2009 | | |
| WO | WO2010/044958 | 4/2010 | | F02C 9/00 |
| WO | WO2010/066048 | 6/2010 | | F22B 1/22 |
| WO | WO2010/141777 | 12/2010 | | F02C 9/00 |
| WO | WO2011/028322 | 3/2011 | | E21B 43/40 |
| WO | WO2011/028356 | 3/2011 | | F01K 13/00 |
| WO | WO2012/003076 | 1/2012 | | F02C 7/08 |
| WO | WO2012/003077 | 1/2012 | | F02C 6/00 |
| WO | WO2012/003078 | 1/2012 | | F02C 3/34 |
| WO | WO2012/003079 | 1/2012 | | F02C 3/34 |
| WO | WO2012/003080 | 1/2012 | | F02C 6/00 |
| WO | WO2012/003489 | 1/2012 | | F16K 3/28 |
| WO | WO2012/018457 | 2/2012 | | F02C 3/20 |
| WO | WO2012/018458 | 2/2012 | | F02C 3/00 |

OTHER PUBLICATIONS

Anderson, R. E. (2006) "Durability and Reliability Demonstration of a Near-Zero-Emission Gas-Fired Power Plant," *California Energy Comm.*, CEC 500-2006-074, 80 pgs.

Baxter, E. et al. (2003) "Fabricate and Test an Advanced Non-Polluting Turbine Drive Gas Generator," *U. S. Dept. of Energy, Nat'l Energy Tech. Lab.*, DE-FC26-00NT 40804, 51 pgs.

Bolland, O. et al. (1998) "Removal of $CO_2$ From Gas Turbine Power Plants Evaluation of Pre- and Postcombustion Methods," *SINTEF Group*, 1998, www.energy.sintef.no/publ/xergi/98/3/art-8engelsk.htm, 11 pgs.

BP Press Release (2006) "BP and Edison Mission Group Plan Major Hydrogen Power Project for California," Feb. 10, 2006, www.bp.com/hydrogenpower, 2 pgs.

Bryngelsson, M. et al. (2005) "Feasibility Study of CO2 Removal From Pressurized Flue Gas in a Fully Fired Combined Cycle—The Sargas Project," *KTH—Royal Institute of Technology, Dept. of Chemical Engineering and Technology*, 9 pgs.

Clark, Hal (2002) "Development of a Unique Gas Generator for a Non-Polluting Power Plant," *California Energy Commission Feasibility Analysis*, P500-02-011F, Mar. 2002, 42 pgs.

Defrate, L. A. et al. (1959) "Optimum Design of Ejector Using Digital Computers" *Chem. Eng. Prog. Symp. Ser.*, 55 (21) pp. 43-51.

Ditaranto, M. et al. (2006) "Combustion Instabilities in Sudden Expansion Oxy-Fuel Flames," *ScienceDirect, Combustion and Flame*, v.146, Jun. 30, 2006, pp. 493-51.

Elwell, L. C. et al. (2005) "Technical Overview of Carbon Dioxide Capture Technologies for Coal-Fired Power Plants," *MPR Associates, Inc.*, Jun. 22, 2005, 15 pgs.

Ertesvag, I. S. et al. (2005) "Exergy Analysis of a Gas-Turbin Combined-Cycle Power Plant With Precombustion $CO_2$ Capture," Elsivier, 2004, pp. 5-39.

Luby, P. et al. (2003) "Zero Carbon Power Generation: IGCC as the Premium Option," *Powergen International*, 19 pgs.

MacAdam, S. et al. (2008) "Coal-Based Oxy-Fuel System Evaluation and Combustor Development," *Clean Energy Systems, Inc.* 6 pgs.

Morehead, H. (2007) "Siemens Global Gasification and IGCC Update," *Siemens, Coal-Gen*, Aug. 3, 2007, 17 pgs.

Reeves, S. R. (2001) "Geological Sequestration of $CO_2$ in Deep, Unmineable Coalbeds: An Integrated Research and Commercial-Scale Field Demonstration Project," *SPE 71749*, 10 pgs.

Reeves, S. R. (2003) "Enhanced Coalbed Methane Recovery," *SPE 101466-DL*, 8 pgs.

Richards, G. A. et al. (2001) "Advanced Steam Generators," *National Energy Technology Laboratory*, 7 pgs.

Snarheim, D. et al. (2006) "Control Design for a Gas Turbine Cycle With $CO_2$ Capture Capabilities," *Modeling, Identification and Control*, vol. 00, 10 pgs.

Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng., Norwegian Univ. of Science and Technology*, 9 pgs.

vanHemert, P. et al. (2006) "Adsorption of Carbon Dioxide and a Hydrogen-Carbon Dioxide Mixture," *Intn'l Coalbed Methane Symposium* (Tuscaloosa, AL) Paper 0615, 9 pgs.

Zhu, J. et al. (2002) "Recovery of Coalbed Methane by Gas Injection," *SPE 75255*, 15 pgs.

* cited by examiner

SYSTEMS AND METHODS FOR EXHAUST GAS EXTRACTION

CROSS-REFERENCE TO RELATED APPLICATIONS

This application is the National Stage entry under 35 U.S.C. 371 of PCT/US2011/042019, that published as WO 2012/018458 and was filed on 27 Jun. 2011 which claims the benefit of U.S. Provisional Application No. 61/371,527, filed on 6 Aug. 2010, each of which is incorporated by reference, in its entirety, for all purposes.

FIELD

The present disclosure relates generally to low-emission power generation systems. More particularly, the present disclosure relates to systems and methods for recycling exhaust gas from a gas turbine.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

A conventional gas turbine engine often has a turbine compressor that is mechanically linked to a turbine expander through a shaft. The turbine compressor can be used to compress a flow of air ingested by the turbine compressor. The compressed air is then passed to a combustor. In the combustor, fuel is injected and ignited to create a continuous flame. The high pressure exhaust gases from the flame are flowed into the turbine expander, which generates mechanical energy from the exhaust gas as it expands. The mechanical energy, transferred through the shaft to the turbine compressor, is used to power the compression of the air. Additional mechanical energy is produced, over the amount used to compress the ingested air, and harvested for other purposes, for example, to generate electricity. The flame temperature can exceed the metallurgical limits of the combustor can, so an excess amount of air is often used to provide cooling. However, this arrangement may create a higher amount of pollutants, such as nitrogen oxides (NOxs).

Capturing carbon dioxide from the exhaust gas for other uses may be problematic for a number of reasons. For example, there is a low concentration of carbon dioxide in the exhaust of a conventional gas turbine and a very large volume of gas has to be treated. The exhaust stream is relatively low pressure, e.g., around 1050 kPa. The exhaust stream may be very high temperature at around 425° C. to 700° C. Further, the exhaust gas may contain a large amount of oxygen that may interfere with $CO_2$ extraction or use. Finally the exhaust gas may be saturated with water from cooling, which can increase a reboiler duty in the $CO_2$ extraction system.

The combustion of fuel within a combustor, e.g., integrated with a gas turbine, can be controlled by monitoring the temperature of the exhaust gas leaving the expander, because temperatures are generally too high in the combustor for existing instrumentation. At full load, typical gas turbines adjust the amount of fuel introduced to a number of combustors in order to reach a desired combustion gas or exhaust gas temperature.

However, controlling the amount of oxidant introduced to the combustor can be desirable when an objective is to capture carbon dioxide ($CO_2$) from the exhaust gas. Current carbon dioxide capture technology is expensive for several reasons. For example, the low pressure and low concentration of carbon dioxide in an exhaust gas. The carbon dioxide concentration, however, can be significantly increased from about 4% to greater than 10% by operating the combustion process under substantially stoichiometric conditions. Further, a portion of the exhaust gas may be recycled to the combustor as a diluent for cooling the products of combustion instead of air. The benefit of using recycle gas as the coolant is that the amount of oxygen in the recycle gas sent to the $CO_2$ capture facilities can be controlled at low levels. A low oxygen level may allow a wide range of solvents to be utilized for the capture of carbon dioxide.

The enhanced exhaust gases may be captured for use by other systems, for example, directly from the exhaust of the gas turbine. However, if a gas turbine is being supplied an oxidant from a separate source, it may be more effective to compress the exhaust in the turbine compressor of the gas turbine, and recycle the compressed gas to the combustors as a coolant, then capture a high pressure bleed flow during the control of the recycle flow. Numerous studies have examined the concept of recycling a portion of the exhaust gases to the combustor.

For example, U.S. Pat. No. 4,271,664 to Earnest discloses a turbine engine with exhaust gas recirculation. The engine has a main power turbine operating on an open-loop Brayton cycle. The air supply to the main power turbine is furnished by a compressor independently driven by the turbine of a closed-loop Rankine cycle which derives heat energy from the exhaust of the Brayton turbine. A portion of the exhaust gas is recirculated into the compressor inlet during part-load operation. However, the recycled exhaust gas is taken from a final vent, without further compression. Further, no additional uses are disclosed for the recycled exhaust.

U.S. Patent Application Publication No. 2009/0064653 by Hagen, et al., discloses partial load combustion cycles. The part load method controls delivery of diluent fluid, fuel fluid, and oxidant fluid in thermodynamic cycles using a diluent to increase the turbine inlet temperature and thermal efficiency in part load operation above that obtained by relevant art part load operation of Brayton cycles, fogged Brayton cycles, or cycles operating with some steam delivery, or with maximum steam delivery.

International Patent Application Publication No. WO/2010/044958 by Mittricker, et al., discloses methods and systems for controlling the products of combustion. One embodiment includes a combustion control system having an oxygenation stream substantially comprising oxygen and carbon dioxide and having an oxygen to carbon dioxide ratio, then mixing the oxygenation stream with a combustion fuel stream and combusting in a combustor to generate a combustion products stream having a temperature and a composition detected by a temperature sensor and an oxygen analyzer, respectively. The data from the sensors are used to control the flow and composition of the oxygenation and combustion fuel streams. The system may also include a gas turbine with an expander and having a load and a load controller in a feedback arrangement.

International Patent Application Publication No. WO/2009/120779 by Mittricker, et al., discloses systems and methods for low emission power generation and hydrocarbon recovery. One system includes integrated pressure maintenance and miscible flood systems with low emission power generation. An alternative system provides for low emission power generation, carbon sequestration, enhanced oil recovery (EOR), or carbon dioxide sales using a hot gas expander and external combustor. Another alternative system provides for low emission power generation using a gas power turbine to compress air in the inlet compressor and generate power using hot carbon dioxide laden gas in the expander.

The prior systems disclose adding the diluent to the oxidant prior to or during the combustion process. Further, conventional gas turbine systems and the systems disclosed above, may obtain a high pressure stream from a bleed valve on the compressor for other purpose, such as heating the inlet air. This bleed stream may is normally limited to 5 to 10% of the total flow from the compressor. If the oxidant being used in the stoichiometric combustion of the fuel is air, very large extraction rates (about 40% of the total recycle gas stream) are required. These large extraction flows would not be possible on commercially available gas turbines without expense modifications.

SUMMARY

An exemplary embodiment of the present techniques provides a spool piece for a combustor on a gas turbine. The spool piece includes an oxidant injection port configured for injection of an oxidant proximate to a flame in the combustor and a recycle-gas extraction port configured for an extraction of a recycle gas from the combustor. In the spool piece the recycle gas is isolated from the oxidant prior to the use of the oxidant in a flame.

The spool piece may include an injection lance configured to inject the oxidant directly into the flame. The oxidant comprises a mixture of oxygen and a diluent gas. The spool piece may include a partially perforated combustion liner configured to be cooled by an injection of the recycle gas. The spool piece may include a swirler configured to create a spiral flow in the oxidant to enhance mixing with a fuel. The spool piece may be configured to replace a current spool piece on a combustor on a gas turbine engine.

Another exemplary embodiment provides a method for operating a gas turbine engine. The method includes injecting an oxidant into an oxidant injection port on a combustor, wherein the combustor is configured to convey the oxygen to a flame in the combustor. The method also includes cooling a portion of an exhaust gas from the gas turbine engine to form a cooled exhaust gas, compressing the cooled exhaust gas to form a recycle gas, and flowing the recycle gas around a perforated combustion can disposed around the flame to cool the perforated combustion can and form a hot recycle gas, wherein the oxidant mixture and the recycle gas do not mix before the flame. In the method a portion of the hot recycle gas is removed through a recycle-gas extraction port on the combustor.

The method may also include compressing the recycle gas in the compressor section of the gas turbine prior to injecting the recycle gas into the combustor. Further, the method may include compressing the oxidant mixture in a compressor external to the gas turbine. The recycle gas may be cooled in a direct contact cooler. The method may include transferring heat energy from the hot recycle gas to the oxidant, or to a fuel, or to both, prior to their injection into the combustor.

The method may include controlling an injection of the oxidant, a fuel, or both, to all combustors to adjust a composition of an exhaust gas. The injection of the oxidant, a fuel, or both, to each of a plurality of combustors may be individually controlled to adjust a composition of an exhaust gas. The method may include cooling the hot recycle gas to form a cooled recycle gas and separating carbon dioxide from the cooled recycle gas.

Another exemplary embodiment provides a gas turbine system. The gas turbine system includes a combustor, comprising a recycle gas port configured for an injection of a recycle gas for cooling the combustor, an oxidant injection port configured for a injection of an oxidant proximate to a flame in the combustor, and a recycle-gas extraction port configured for an extraction of a recycle gas from the combustor, wherein the oxidant is isolated from the recycle gas prior to the use of the oxidant in the flame.

The gas turbine system may also include a compressor and a turbine expander, wherein the compressor and turbine expander are mechanically coupled so that mechanical energy is transferred from the turbine expander to the compressor. The gas turbine system may further include a carbon dioxide removal system.

A heat recovery unit may be included in the gas turbine system to harvest energy from an exhaust gas from the gas turbine system. The heat recovery unit may include a heat recovery steam generator. The gas turbine system may include a turbine driven by energy recovered from the heat recovery unit. The gas turbine system may include a heat exchanger configured to heat an oxidant with heat recovered from the recycle gas extracted from the combustor. The gas turbine system may include a heat exchanger configured to heat a fuel with heat recovered from the recycle gas extracted from the combustor.

DESCRIPTION OF THE DRAWINGS

The advantages of the present techniques are better understood by referring to the following detailed description and the attached drawings, in which.

DETAILED DESCRIPTION

Figure 1:
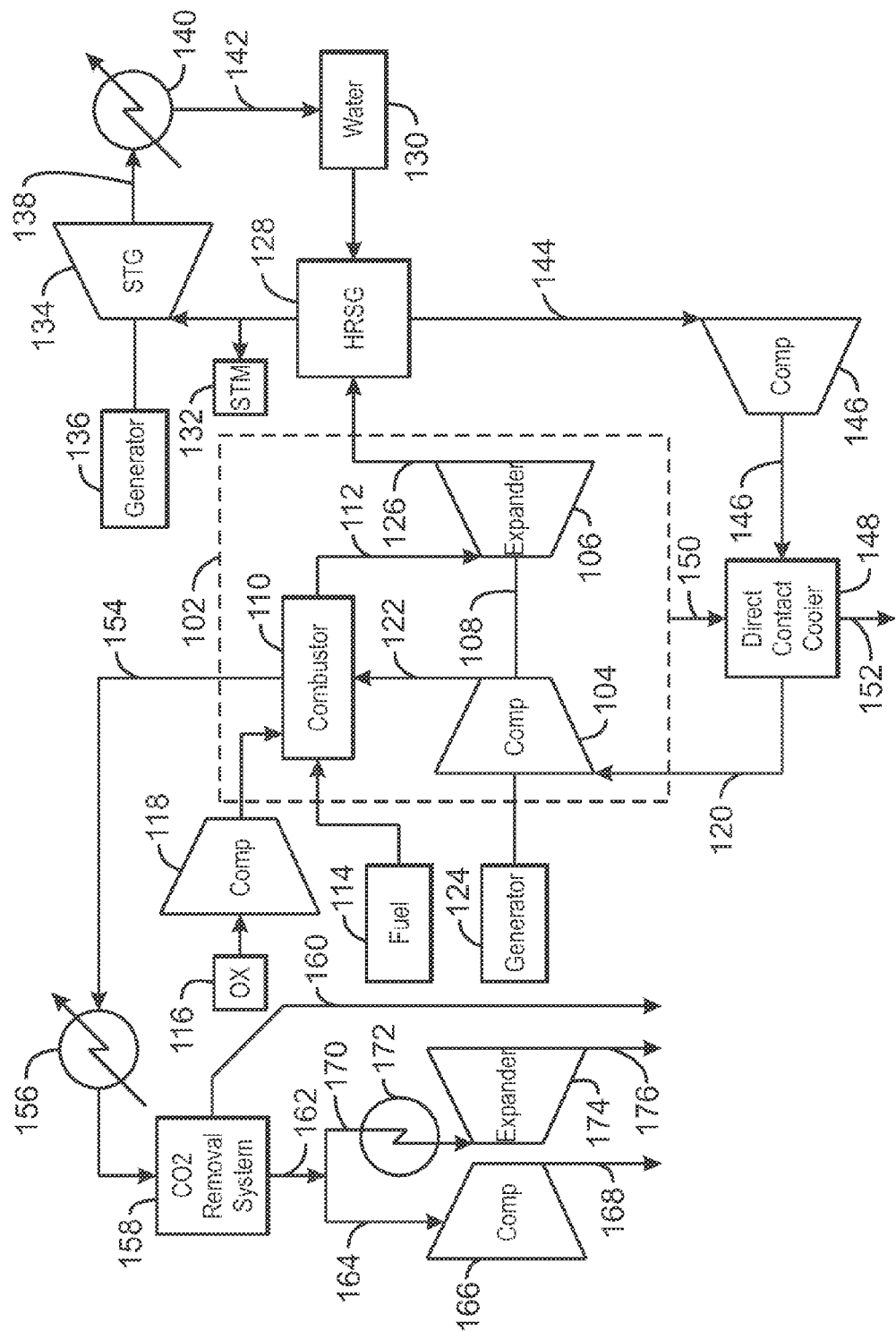
FIG. 1 is a schematic diagram of a gas turbine system that includes a gas turbine.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

An "adsorbent" may be used to extract carbon dioxide from an exhaust gas flow. The absorbent may be used in a series of parallel beds, which can be switched when an absorbent in a bed has reached capacity. The bed that is removed from the flow can then be treated, such as heated, to desorb the carbon dioxide.

Suitable adsorbents for carbon dioxide adsorption in the present applications have reasonably large working capacity over the relevant temperature range and composition range, good selectivity for carbon dioxide over other undesired constituents (such as $N_2$ and $O_2$), good kinetics, high durability, good compatibility, and reasonably low cost. Several solid adsorbents are potential candidates for carbon dioxide capture. For example, molecular sieves are materials whose atoms are arranged in a lattice or framework in such a way that a large number of interconnected uniformly sized pores exist. The pores generally only admit molecules of a size about equal to or smaller than that of the pores. Molecular sieves, thus, can be used to adsorb and separate or screen molecules based on their size with respect to the pores. One class of molecular sieves is zeolites. Zeolites are hydrated silicates of aluminum and frequently contain cations, which are exchangeable. Zeolites can be naturally occurring or artificial. Naturally occurring types include chabazite, clinoptilolite, erionite, heulandite, and mordenite, to name but a few. Artificial zeolites including, for example, types A, D, L, R, S, T, X, Y, ZSM, mordenite, or clinoptilolite, may also be used. Further, solution adsorption systems, such as chemisorption, may also be used. These adsorption systems may be based on amines, carbonates, or any number of other materials that use chemisorption processes.

"Physical absorption" means absorbing a product, such as carbon dioxide, from a gaseous feed stream by passing the feed stream into a liquid which preferentially adsorbs the product from the feed stream at a relatively high pressure, for example, about 2.07 to 13.8 MPa. The feed stream that is depleted of the absorbed product is removed from the liquid. The product can then be recovered from the liquid such as by lowering the pressure over the liquid or by stripping the product out of the liquid. Unlike other solvent based processes, such as those based on amines or carbonates, the absorption of the carbon dioxide into the liquid does not involve a chemical reaction of the carbon dioxide. An example of a physical adsorption process is the SELEXOL™ process available from the UOP LLC subsidiary of the HONEYWELL Corporation.

A "carbon sequestration facility" is a facility in which carbon dioxide can be controlled and sequestered in a repository such as, for example, by introduction into a mature or depleted oil and gas reservoir, an unmineable coal seam, a deep saline formation, a basalt formation, a shale formation, or an excavated tunnel or cavern. Further, sequestration can be combined with other uses for the sequestered gas, such as increasing hydrocarbon production in tertiary oil recovery from an active reservoir.

A "combined cycle power plant" is generally the combination of an open Brayton Cycle and a Rankine cycle. Combined cycle power plants use both steam and gas turbines to generate power, although other working fluids, besides water and steam, may be used in the Rankine cycle. The combined cycle gas/steam power plants generally have a higher energy conversion efficiency than gas or steam only plants. A combined cycle plant's efficiencies can be as high as 50% to 60% of a lower heating value (LHV). The higher combined cycle efficiencies result from synergistic utilization of a combination of the gas turbine with the steam turbine. Typically, combined cycle power plants utilize heat from the gas turbine exhaust to boil water to generate steam. The boilers in typical combined cycle plants can be referred to as heat recovery steam generator (HRSG). The steam generated is utilized to power a steam turbine in the combined cycle plant. The gas turbine and the steam turbine can be utilized to separately power independent generators, or in the alternative, the steam turbine can be combined with the gas turbine to jointly drive a single generator via a common drive shaft.

A diluent is a gas used to lower the concentration of oxidant fed to a gas turbine to combust a fuel. The diluent may be an excess of nitrogen, carbon dioxide, combustion exhaust, or any number of other gases. In embodiments, the diluent may also provide cooling to a combustor.

As used herein, a "compressor" includes any type of equipment designed to increase the pressure of a fluid or working fluid, and includes any one type or combination of similar or different types of compression equipment. A compressor may also include auxiliary equipment associated with the compressor, such as motors, and drive systems, among others. The compressor may utilize one or more compression stages, for example, in series. Illustrative compressors may include, but are not limited to, positive displacement types, such as reciprocating and rotary compressors for example, and dynamic types, such as centrifugal and axial flow compressors, for example. For example, a compressor may be a first stage in a gas turbine engine, as discussed in further detail below.

A "control system" typically comprises one or more physical system components employing logic circuits that cooperate to achieve a set of common process results. In an operation of a gas turbine engine, the objectives can be to achieve a particular exhaust composition and temperature. The control system can be designed to reliably control the physical system components in the presence of external disturbances, variations among physical components due to manufacturing tolerances, and changes in inputted set-point values for controlled output values. Control systems usually have at least one measuring device, which provides a reading of a process variable, which can be fed to a controller, which then can provide a control signal to an actuator, which then drives a final control element acting on, for example, an oxidant stream. The control system can be designed to remain stable and avoid oscillations within a range of specific operating conditions. A well-designed control system can significantly reduce the need for human intervention, even during upset conditions in an operating process.

An "equivalence ratio" refers to the mass ratio of fuel to oxygen entering a combustor divided by the mass ratio of fuel to oxygen when the ratio is stoichiometric. A perfect combustion of fuel and oxygen to form carbon dioxide and water would have an equivalence ratio of 1. A too lean mixture, e.g., having more oxygen than fuel, would provide an equivalence ratio less than 1, while a too rich mixture, e.g., having more fuel than oxygen, would provide an equivalence ratio greater than 1.

A "fuel" includes any number of hydrocarbons that may be combusted with an oxidant to power a gas turbine. Such hydrocarbons may include natural gas, treated natural gas, kerosene, gasoline, or any number of other natural or synthetic hydrocarbons. In one embodiment, natural gas from an oil field is purified and used to power the turbine. In another embodiment, a reformed gas, for example, created by processing a hydrocarbon in a steam reforming process may be used to power the turbine.

A "gas turbine" engine operates on the Brayton cycle. If the exhaust gas is vented to the atmosphere, this is termed an open Brayton cycle, while recycling of the exhaust gas gives a closed Brayton cycle. As used herein, a gas turbine typically includes a compressor section, a number of combustors, and a turbine expander section. The compressor may be used to compress an oxidant, which is mixed with a fuel and channeled to the combustors. The mixture of fuel and oxidant is then ignited to generate hot combustion gases. The combustion gases are channeled to the turbine expander section which extracts energy from the combustion gases for powering the compressor, as well as producing useful work to power a load. In embodiments discussed herein, the oxidant may be provided to the combustors by an external compressor, which may or may not be mechanically linked to the shaft of the gas turbine engine. Further, in embodiments, the compressor section may be used to compress a diluent, such as recycled exhaust gases, which may be fed to the combustors as a coolant.

A "heat recovery steam generator" or HRSG is a heat exchanger or boiler that recovers heat from a hot gas stream. It produces steam that can be used in a process or used to drive a steam turbine. A common application for an HRSG is in a combined-cycle power plant, where hot exhaust from a gas turbine is fed to the HRSG to generate steam which in turn drives a steam turbine. This combination produces electricity more efficiently than either the gas turbine or steam turbine alone.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in raw natural gas, such as $CH_4$, $C_2H_2$, $C_2H_4$, $C_2H_6$, $C_3$ isomers, $C_4$ isomers, benzene, and the like.

An "oxidant" is a gas mixture that can be flowed into the combustors of a gas turbine engine to combust a fuel. As used herein, the oxidant may be oxygen mixed with any number of other gases as diluents, including carbon dioxide ($CO_2$), $N_2$, air, combustion exhaust, and the like. Other gases that function as oxidizers may be present in the oxidant mixture in addition to oxygen, including ozone, hydrogen peroxide, NOxs, and the like.

A "sensor" refers to any device that can detect, determine, monitor, record, or otherwise sense the absolute value of or a change in a physical quantity. A sensor as described herein can be used to measure physical quantities including, temperature, pressure, $O_2$ concentration, CO concentration, flow rate, acoustic data, vibration data, chemical concentration, valve positions, or any other physical data. The sensors described herein will generally operate in real time, e.g., completing a measurement cycle of less than 15 s, 10 s, 5 s, 1 s, or shorter.

"Pressure" is the force exerted per unit area by the gas on the walls of the volume. Pressure can be shown as pounds per square inch (psi). "Atmospheric pressure" refers to the local pressure of the air. "Absolute pressure" (psia) refers to the sum of the atmospheric pressure (14.7 psia at standard conditions) plus the gage pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia). The term "vapor pressure" has the usual thermodynamic meaning. For a pure component in an enclosed system at a given pressure, the component vapor pressure is essentially equal to the total pressure in the system.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

Overview

Embodiments of the present invention provide a system and a method for harvesting a recycle gas from a combustor on a gas turbine engine. The system includes a spool piece having an oxidant injection port and a recycle-gas extraction port. The ports above do not replace a coupling from the outlet of compressor stage of the gas turbine engine to the combustor. Thus, this coupling may be used to feed compressed recycled gas to the combustor as a coolant. In embodiments, a portion of the compressed recycled gas, e.g., about 60%, may be incorporated into the exhaust gas generated during the combustion, while another portion, e.g., about 40%, may be harvested from the recycle-gas extraction port. The spool piece may be designed to prevent mixing of the compressed recycled gas and the oxidant, e.g., directly injecting the oxidant into the flame, which may prevent contamination of the exhaust gas with oxygen from the oxidant and simplify controlling the equivalence ratio of oxygen to fuel in the combustion. Further, the spool piece may be designed as a replacement part that could be added to the combustor flange on the casing of a standard gas turbine engine, allowing an upgrade to the system without a substantial redesign.

In embodiments, the spool piece may be combined with methods for controlling the stoichiometry of the burn. The control may be based, at least in part, on measurements from sensors, for example, located in a ring on an exhaust expander. The sensors may include oxygen analyzers, carbon monoxide analyzers, and temperature sensors, among others. Further, combinations of different types of sensors may be used to provide further information.

The use of individually controlled combustors may increase the burn efficiency of a gas turbine engine, e.g., making the burn closer to a one-to-one equivalence ratio. Such improvements in efficiency may lower $O_2$ and unburned hydrocarbons in the exhaust, make capturing carbon dioxide from the exhaust gas more efficient. This may improve the capture of the carbon dioxide from the turbine for use in enhanced oil recovery, as well as in sequestration.

FIG. 1 is a schematic diagram of a gas turbine system 100 that includes a gas turbine 102. The gas turbine 102 may have a compressor 104 and a turbine expander 106 on a single shaft 108. The gas turbine 102 is not limited to a single shaft arrangement, as multiple shafts could be used, generally with mechanical linkages or transmissions between shafts. In embodiments, the gas turbine 102 also has a number of combustors 110 that feed hot exhaust gas to the expander, for example, through an exhaust line 112 associated with each combustor 110. For example, a gas turbine 102 may have 2, 4, 6, 14, 18, or even more combustors 110, depending on the size of the gas turbine 102.

The combustors 110 are used to burn a fuel provided by a fuel source 114. An oxidant 116 may be provided to each of the combustors 110 from various sources. For example, in embodiments, an external oxidant source may feed the oxidant 116 to an external compressor 118, which may compress the oxidant 116 for the combustors 110. In embodiments, recycled exhaust gas 120, may be compressed in the compressor 104 and then provided to the combustors 110 through line 122 as a coolant.

The exhaust gas from the combustors 110 expands in the turbine expander 106, creating mechanical energy which may be used to generate electrical power in a generator 124. A portion of the mechanical energy may also power the compressor 104 through the shaft 108. Further, a portion of the mechanical energy may be to power the external compressors 118 for the oxidant 116. The expanded exhaust gas 126 may be provided to an external heat recovery unit, such as a heat recovery steam generator (HRSG) 128. The heat recovery unit is not limited to a HRSG 128 as any number of other units may be used. For example, heat exchangers may be used to provide heat to utility feeds for a plant or an organic Rankine cycle (ORC) generator may be used to generate electricity.

In the HRSG 128, water from a condenser sump 130 is recycled back and boiled to form steam, which may also be superheated. The steam may be provided as a utility feed 132 to a plant or may be sent to a steam turbine 134, for example, to power another generator 136 to produce power. Both functions may be performed together, such as in a cogeneration facility associated with a plant or refinery. The reduced pressure stream 138 may be sent to a cooling tower of other heat exchanger 140 for cooling and condensation of remaining steam. The heat exchanger 140 may be a part of a further heat recovery system, such as an organic Rankine cycle (ORC) generator, or a flash evaporator to recover fresh water from a brine. The cooled water stream 142 may be returned to the water storage vessel 130 to restart the Rankine cycle.

After leaving the HRSG 128, the exhaust stream 144 may be recompressed in a compressor 146. The exhaust stream 144 may have a substantial amount of heat energy, both from the initial burn and from the compression process, for example, being at around 125° C. to 260° C. Thus, the compressed exhaust stream 146 may be cooled, for example, in a direct contact cooler 148 to form a recycled exhaust gas 120. The present techniques are not limited to a direct contact cooler 148, as any number of heat exchangers may be used to cool the compressed exhaust gas 146. The direct contact cooler 148 may generally be a counter-current flow device in which an inlet water stream 150 is introduced near the top of the direct contact cooler 148 and the compressed exhaust stream 146 is introduced near the bottom of the direct contact cooler 148. As the water falls through the exhaust stream, the exhaust stream is cooled and saturated with water. After cooling the compressed exhaust stream 146 leaves the direct contact cooler as the recycled exhaust gas 120. In embodiments, a chiller may be placed in this line to remove a portion of the water prior to the introduction to the compressor 104. The remaining water exits the direct contact cooler 148 as a heated water stream 152, which may be cooled and recycled as the inlet water 150.

In embodiments, the oxidant can be individually metered to each of the combustors 110 to control an equivalence ratio in that combustor 110. It will be apparent to one of skill in the art that a stoichiometric burn, e.g., at an equivalence ratio of 1, may be hotter than the metallurgic tolerances of the equipment. For example, an adiabatic flame temperature of a stoichiometric combustion of methane in air is about 1960° C. and a stoichiometric combustion of methane in oxygen is about 2800° C. Accordingly, cooling can decrease the chance of damage to the equipment. Therefore, in embodiments, the recycle exhaust gas 120 can be introduced into the combustors 110 through line 122 to cool the combustors 110, as discussed further with respect to FIGS. 2 and 3. The use of recycled exhaust gas 120 provides a further advantage in that the exhaust is deficient in oxygen, making it a better material for carbon dioxide recovery for enhanced oil recovery. Further, individually adjusting the oxidant to each combustor 110 may improve the overall efficiency of the gas turbine 102, further increasing the carbon dioxide content of the exhaust gas and, thus, the recycle gas.

A portion of the recycle gas leaves the combustor 110 through the exhaust line 112. For example, about 40%, 60%, 80%, or more of the recycle gas may be sent out with the exhaust gas though the exhaust line 112. The remaining recycle gas, e.g., that which does not leave the combustor 110 in the exhaust line 112, may be harvested from the combustor 110 through a port coupled to a recycle recovery line 154. For example, about 60%, 40%, 20%, or less, of the recycle gas may be harvested through the recycle recovery line 154. The recycle gas in the recycle recovery line 154 will have a substantial amount of heat from the combustors 110, for example, being at a temperature of about 400° C., 525° C., 650° C., or even higher. The recycle gas may be cooled in a heat exchanger 156 or may be cooled while heating the oxidant 116 or fuel 114 feeds to the combustor 110. The heat exchanger 156 may be part of a heat recovery unit, such as a HRSG. For example, the heat exchanger 156 may include several tubes in the HRSG 128. The heat exchanger 156 may also be incorporated with heat exchanger 172 to exchange heat with nitrogen stream 170. After cooling, the recycle gas may be fed to a carbon dioxide ($CO_2$) removal system 158. In embodiments, the $CO_2$ removal system 158 may include a catalytic convertor to convert any NOxs to $N_2$ and $O_2$ or a reformer to convert any excess CO into $CO_2$, or both. The $CO_2$ removal system 158 may include any number of systems configured to separate $CO_2$ from a gas stream, including solid or liquid physical adsorption process, as described above, membrane separation technologies, cryogenic separation processes, solvent separation processes, or any other suitable systems. The $CO_2$ removal system 158 produces two outlet streams, a $CO_2$ stream 160 and a nitrogen stream 162.

In embodiments, the $CO_2$ stream 160 may be used for enhanced oil recovery, for example, being injected into a reservoir to increase the recovery of hydrocarbons. In embodiments, a portion, or all, of the $CO_2$ stream 160 may be stored for carbon sequestration, for example, by being injected into a formation for long term disposal.

The nitrogen stream 162 may be used in a variety of applications. For example, a first nitrogen stream 164 may be compressed in a compressor 166 to form a high pressure nitrogen stream 168, for example, having a pressure of about 500 to 20,000 kPa. The high pressure nitrogen stream 168 may be used, for example, for pressure maintenance of units such as storage vessels or oil reservoirs. A second nitrogen stream 170 may be heated in a heat exchanger 172, and then reduced in pressure in an expander 174 to form a low pressure nitrogen stream 176. The low pressure nitrogen stream 176 may be used to provide a nitrogen vent stream for other applications, such as a sweep gas to carry flammable gases in a flare system to a flare, a coolant for psychrometric use, or it may be vented to the atmosphere. The other potential use of the nitrogen is that it can be cooled and then expanded to provide a coolant stream that can be used in the process, for example, to cool the suction of the recycle gas compressor which would make the compressor and, therefore, the entire process, more efficient.

It will be understood that the gas turbine system 100 has been simplified to assist in explaining various embodiments of the present techniques. Accordingly, in embodiments of the present techniques the various functional blocks shown including, for example, the fuel system 114, the oxidant system 116 and 118, the HRSG 128, and the $CO_2$ removal system 158, among others, can include numerous devices not shown. Such devices can include flow meters, such as orifice flow meters, mass flow meters, ultrasonic flow meters, venturi flow meters, and the like. Other devices can include valves, such as piston motor valves (PMVs) to open and close lines, and motor valves, such as diaphragm motor valves (DMVs), globe valves, and the like, to regulate flow rates. Further, compressors, tanks, heat exchangers, and sensors may be utilized in embodiments in the systems represented by the functional blocks shown.

Spool Pieces for Combustors

Figure 2:
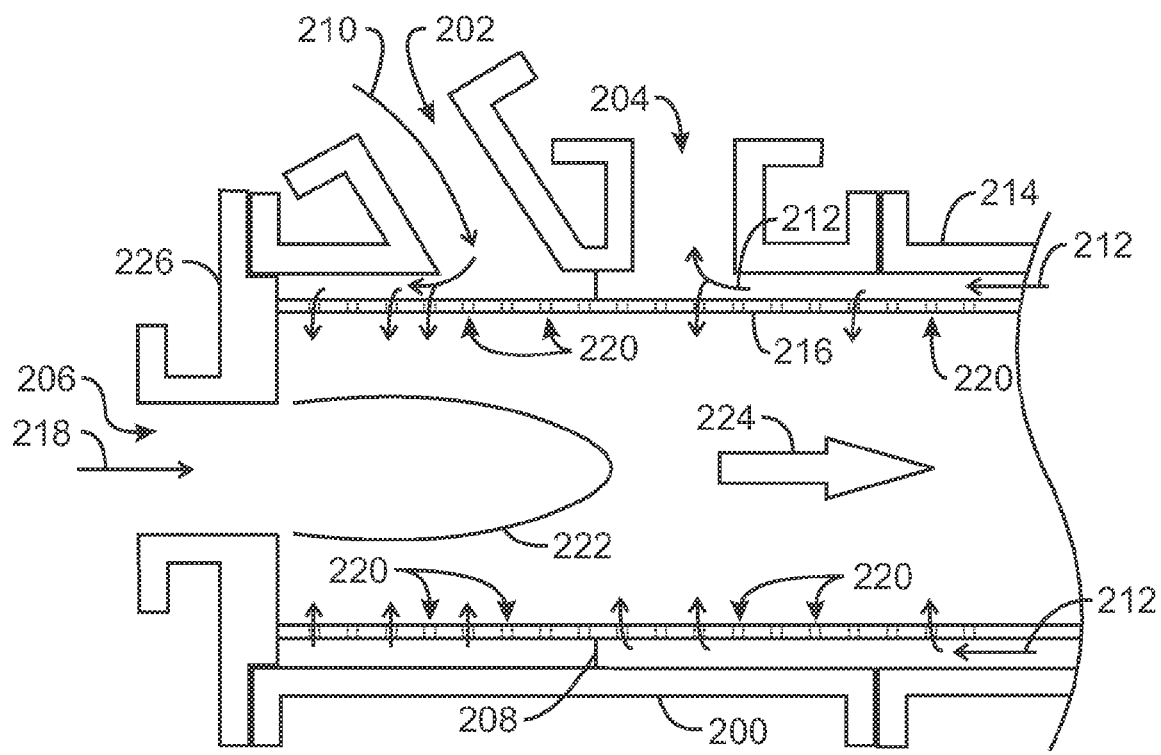
FIG. 2 is a cross-sectional view of a spool piece for a combustor that has a separate oxidant injection port, recycle-gas extraction port, and fuel injection port.

FIG. 2 is a cross-sectional view of a spool piece 200 for a combustor 110 (FIG. 1) that has a separate oxidant injection port 202, recycle-gas extraction port 204, and fuel injection port 206. The spool piece 200 may also contain a barrier 208 to prevent a direct mixing of an oxidant 210 injected through the oxidant injection port 202 with a recycle gas 212, for example, injected through a port on an existing spool piece 214. The spool piece 200 may be designed to replace a more general spool piece (not shown) that does not have the oxidant injection port 202, recycle-gas extraction port 204, or barrier 208. The spool piece 200 may be flanged to bolt in place of a current spool piece, or may have no flange to facilitate welding into place. The choice of techniques may depend on the size of the combustors 110. For example, larger combustors 110 may be modified by welding the new spool piece in place.

As shown in FIG. 2, a perforated combustion can 216, or a partially perforated combustion liner, may line the spool piece 200. A fuel 218 may be injected into the perforated combustion can 216. The oxidant 210 injected through the oxidant injection port 202 can flow through the perforations 220, feeding a flame 222. The recycle gas 212 can flow around the perforated combustion can 216, cooling the can. The barrier 208 prevents a direct mixing of the recycle gas 212 with the oxidant 210 prior to the introduction of the oxidant 210 to the flame 222. The barrier 208 may prevent contamination of the exhaust gases with oxygen from the oxidant feed, potentially enhancing the isolation of the $CO_2$. Further, by preventing the mixing of the oxidant 210 with the recycle gas 212, the barrier 208 may allow better control of the stoichiometry of the combustion.

Some amount, for example, about 40%, 60%, 80%, or more of the recycle gas 212 may pass through the perforations 220, mixing with the high pressure exhaust 224 from the flame 222 and diluting and cooling the high pressure exhaust 224. The remainder of the recycle gas 212 may exit the spool piece 200 through the recycle-gas extraction port 204. The spool piece 200 shown in FIG. 2 is one embodiment, but the present techniques are not limited to this arrangement. For example, in other embodiments, the head flange 226 could be machined to provide lances to cool the head end, and to prevent the flame 222 from impinging on the perforated combustion can 216 and potentially causing damage to the perforated combustion can 216. One example of a more complex embodiment is discussed with respect to FIG. 3.

Figure 3:
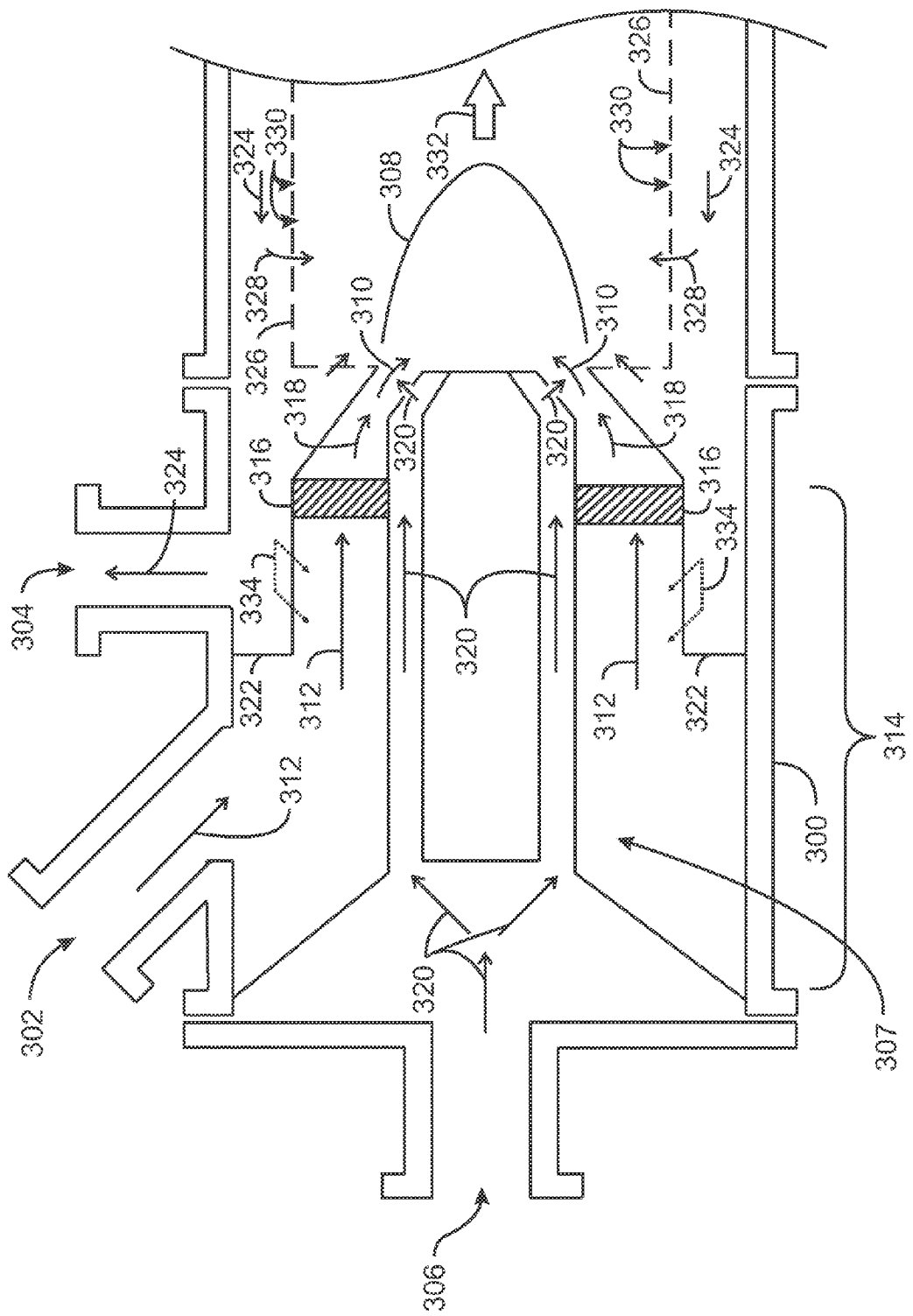
FIG. 3 is a cross sectional view of another spool piece for a combustor that has a separate oxidant injection port, recycle-gas extraction port, and fuel injection port.

FIG. 3 is a cross sectional view of another spool piece 300 for a combustor 110 (FIG. 1) that has a separate oxidant injection port 302, recycle-gas extraction port 304, and fuel injection port 306. In this embodiment, an injection lance 307 is used to create a more controlled flame 308 by directly injecting an oxidant/fuel mixture 310 into the flame 308. As for the embodiment shown in FIG. 2, an oxidant 312 is injected through the oxidant injection port 302. In this case, the oxidant 312 flows through a nozzle region 314 to a swirler 316. The swirler 316 imparts a spiral flow 318 to the oxidant 312, which may enhance mixing with a fuel 320 injected through the fuel injection port 306. A barrier 322 prevents the oxidant 318 from mixing with a flow of recycle gas 324 injected into the combustor 110. As for the embodiment shown in FIG. 2, the recycle gas 324 flows along the outside of a perforated combustion can 326 providing cooling. The perforated combustion can 326 may be suspended from the injection lance 307 or may be supported by other structures in the combustor 110. A portion 328 of the recycle gas 324, for example, about 40%, 60%, 80%, or more, may enter the perforated combustion can 326 through the perforations 330 to further cool and dilute the exhaust gas 332 from the flame 308. The remainder of the recycle gas 324 flows across the outside of the perforated combustion can 326, absorbing heat energy. As the recycle gas 324 flows over the barrier 322, heat exchange 334 occurs between the recycle gas 324 and the oxidant 312, heating the oxidant 312 prior to injection into the flame 308. This may enhance the efficiency of the combustion process.

After passing over the barrier 322, the hot recycled gas 324 is extracted from the recycle-gas extraction port 304. The recycle gas 324 may then be used downstream in other processes, as described with respect to FIG. 1. The spool pieces 200 and 300 are not limited to the designs shown in FIGS. 2 and 3, as any design may be used that allows separate injection of an oxidant and removal of a recycle gas, while preventing mixing of the oxidant and recycle gas before the oxidant is used in a combustion process. Further, a combustor 110 may be designed that integrates the features described above in a single can. In addition to the HRU discussed with respect to FIG. 1, the heat energy extracted with the recycle gas may be used in any number of other energy recovery schemes, for example, as discussed with respect to FIGS. 4, 5, and 6.

Energy Recovery from Recycle Gas

Figure 4:
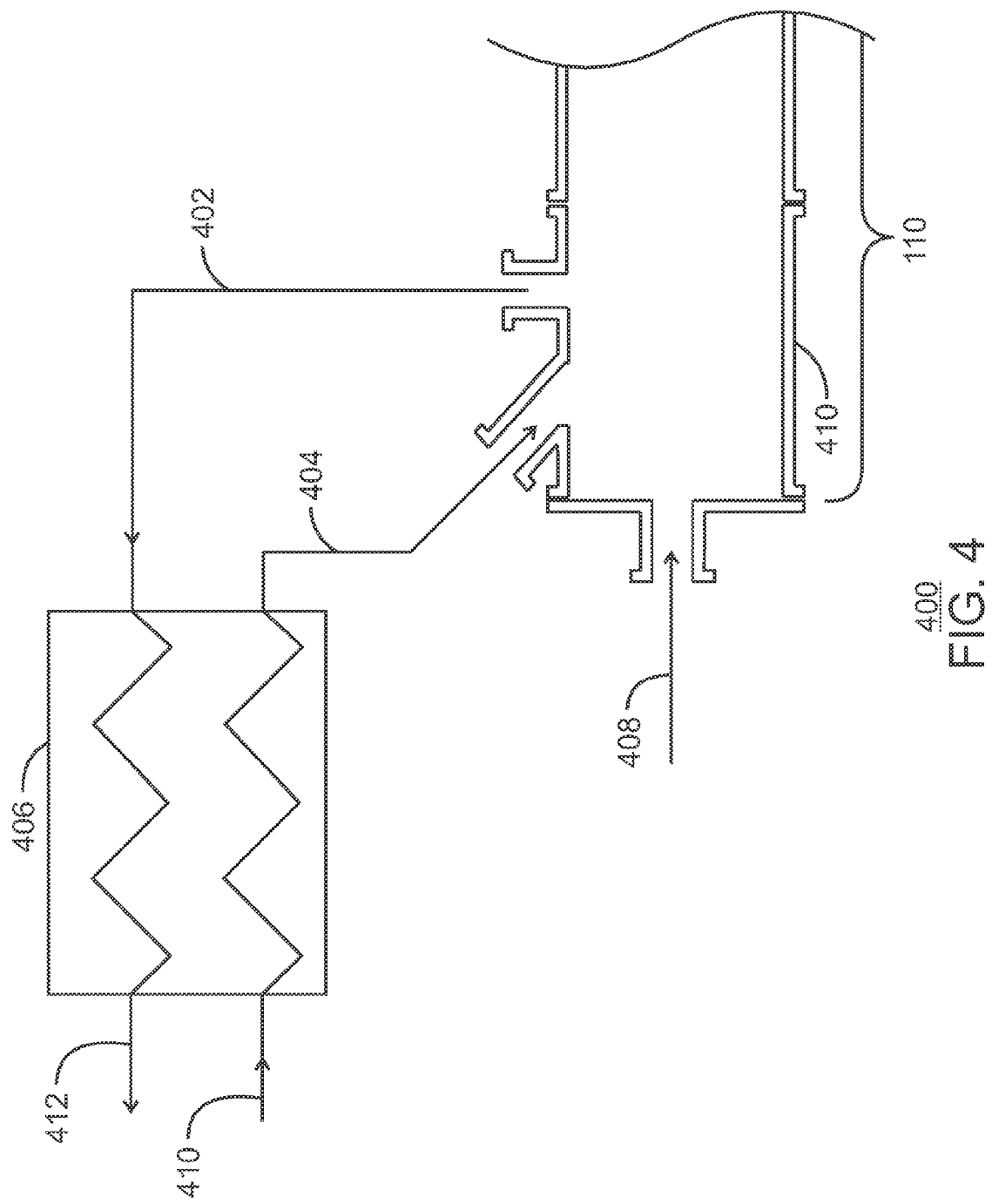
FIG. 4 is a schematic diagram of a heat recovery system that uses the heat from a recycle gas to heat an oxidant in a heat exchanger.

FIG. 4 is a schematic diagram of a heat recovery system 400 that uses the heat from a hot recycle gas 402 to heat an oxidant 404 in a heat exchanger 406. As shown, the heat recovery system 400 has a fuel 408 injected into a spool piece 410 on a combustor 110. The spool piece 410 may be configured as shown in FIG. 2 or 3, or a similar functionality may be incorporated directly into the combustor 110. The fuel 408 and the oxidant 404 feed a flame in the combustor 110. The recycle gas 402 is used for cooling the combustor 110 and for cooling and diluting an exhaust gas from the flame.

After leaving the spool piece 410, the hot recycle gas 402 is fed through the heat exchanger 406 which may be, for example, a shell-tube heat exchanger, a plate heat exchanger, a plate fin heat exchanger, a spiral heat exchanger, and the like. A cool oxidant 410 flows through the heat exchanger 406 and is heated by the recycle gas 402. The hot oxidant 404 may then be injected into the combustor 110. The resulting cooled recycle gas 412 may still retain a substantial amount of heat and can be sent on to other processes for further heat removal, such as heat recovery units, before being fed to the $CO_2$ removal system 158 (FIG. 1). Another use for the cooled recycle gas 412 is to heat the fuel 408, as shown in FIG. 5.

Figure 5:
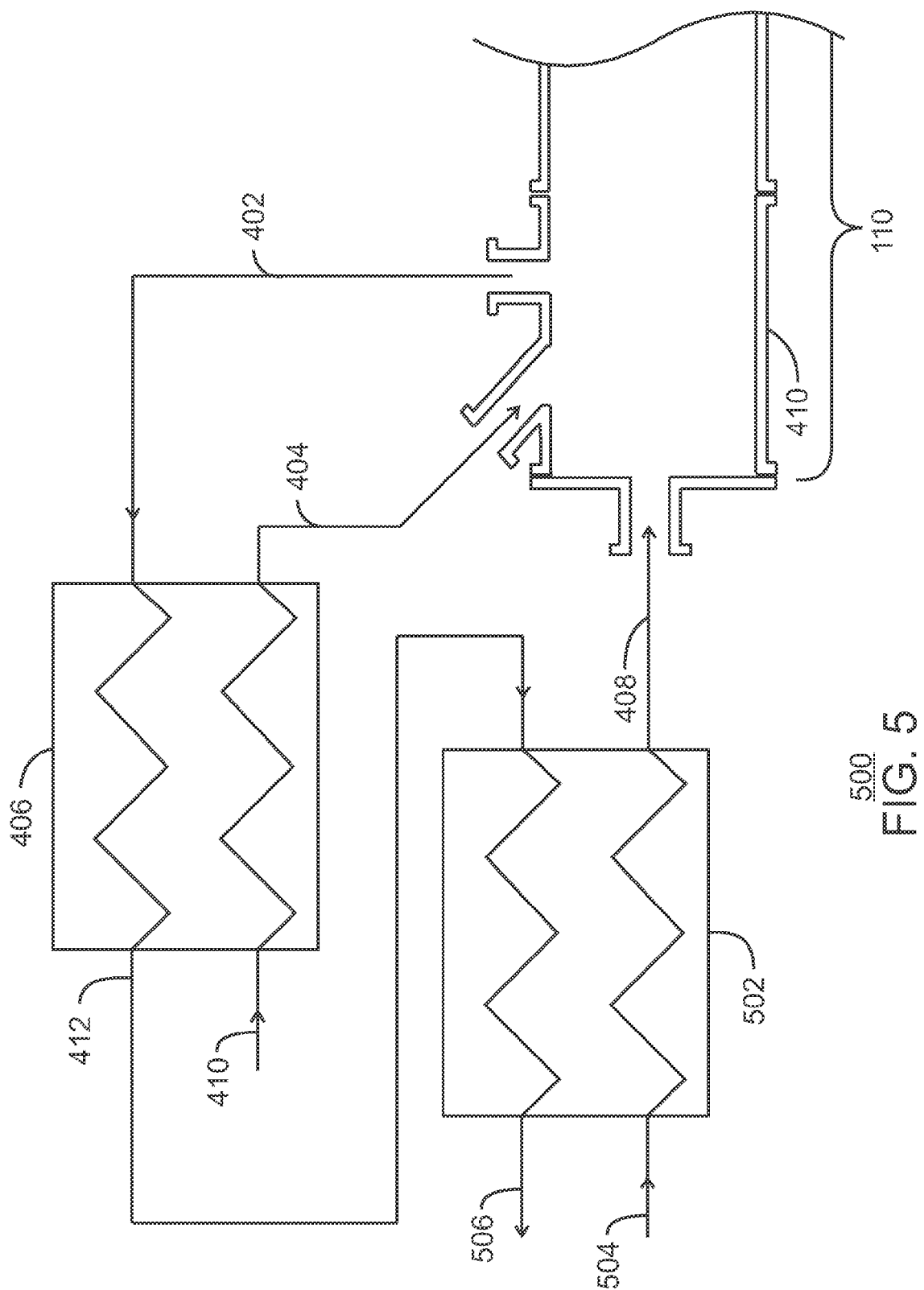
FIG. 5 is a schematic diagram of a heat recovery system that uses the heat from a recycle gas to heat both an oxidant in a first heat exchanger and a fuel in a second heat exchanger.

FIG. 5 is a schematic diagram of a heat recovery system 500 that uses the heat from a recycle gas 402 to heat both an oxidant 404 in a first heat exchanger 406 and a fuel 408 in a second heat exchanger 502. Like numbered units are as discussed with respect to FIG. 4. In this embodiment, after the recycle gas 402 is used to heat the oxidant 404 in the first heat exchanger 406, further energy is harvested in a second heat exchanger 502. In the second heat exchanger 502, a cool fuel flow 504 is heated before the fuel 408 is injected into the spool piece 410 on the combustor 110 (FIG. 1). The cooled recycle gas 506 may still contain a substantial amount of heat energy, which may be removed in a chiller 156, or a HRU. The cooled recycle gas 506 may then be processed for $CO_2$ removal as discussed with respect to FIG. 1. In certain situations, it may be beneficial to heat the fuel 408, but may not be as important to heat the oxidant 404, as discussed with respect to FIG. 6.

Figure 6:
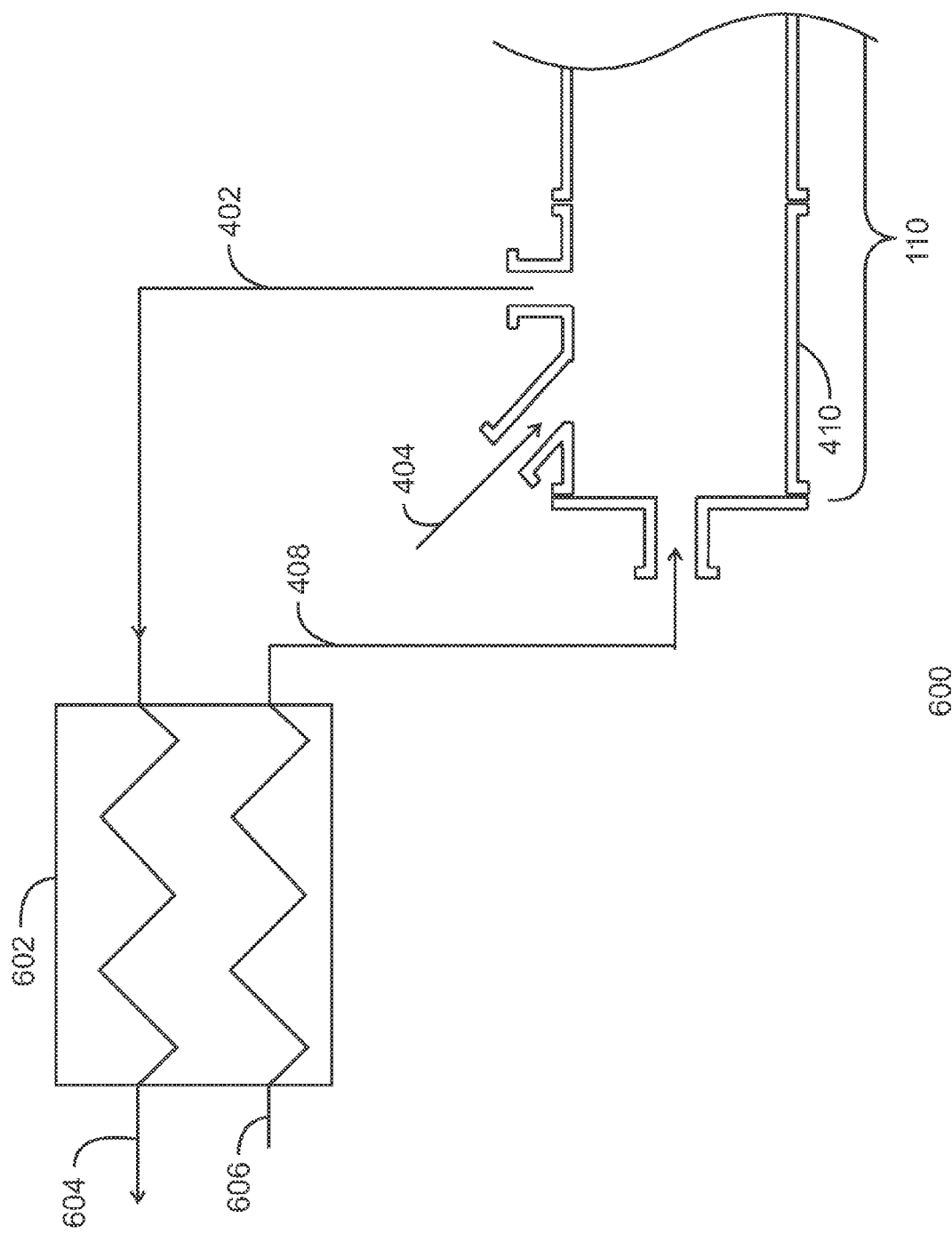
FIG. 6 is a schematic diagram of a heat recovery system that uses the heat from a recycle gas to heat a fuel in a heat exchanger.

FIG. 6 is a schematic diagram of a heat recovery system 600 that uses the heat from a recycle gas 402 to heat a fuel 408 in a heat exchanger 602. As shown in FIG. 6, the hot recycle gas 402 is passed through a heat exchanger 602 to form a cooled recycle gas 604 by transferring energy to a cool fuel 606. The heated fuel 408 may then be injected into the spool piece 410 on a combustor 110 (FIG. 1).

Figure 7:
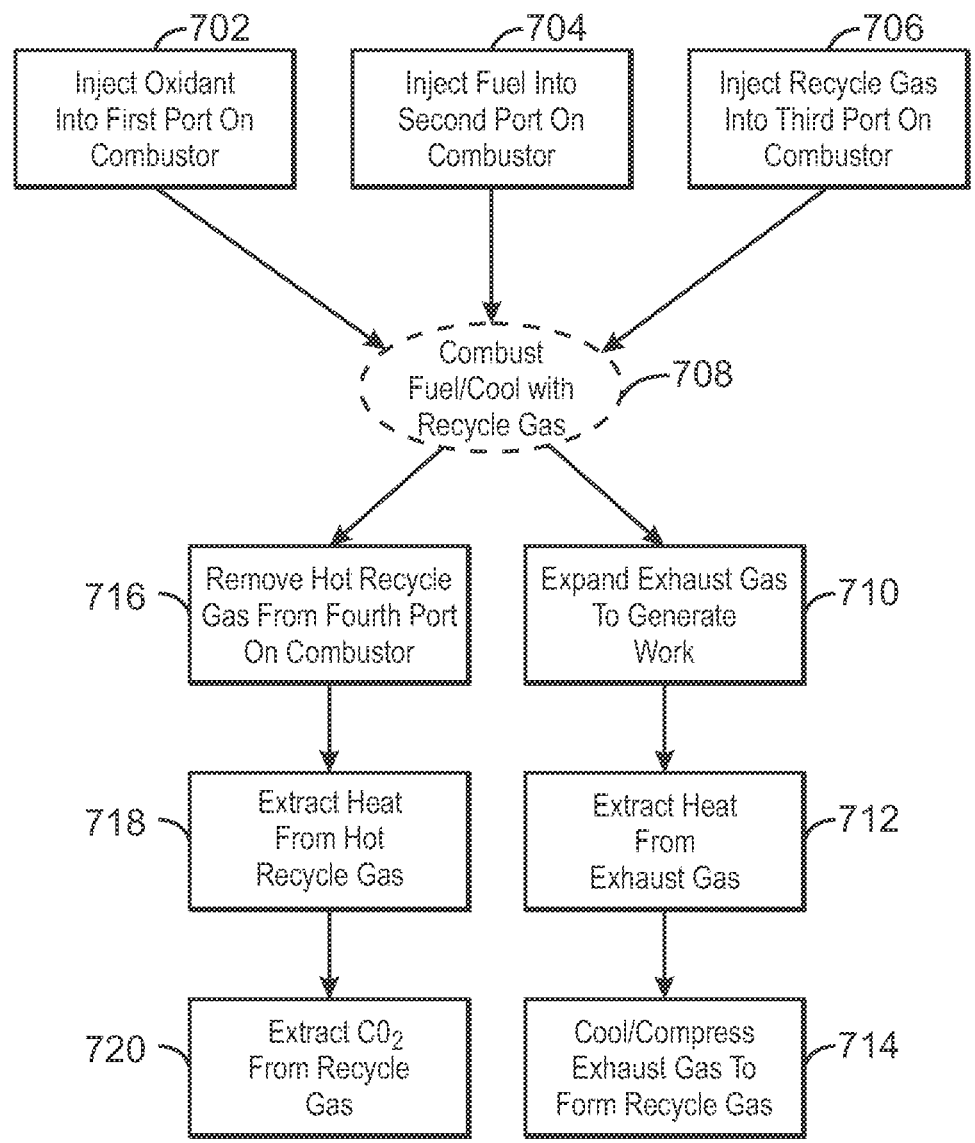
FIG. 7 is a block diagram of a method for extracting hot recycle gas from a combustor, while preventing the recycle gas from mixing with an oxidant.

FIG. 7 is a block diagram of a method 700 for operating a gas turbine as described herein. In the techniques a hot recycle gas is extracted from a combustor, while the recycle gas is prevented from mixing with an oxidant prior to introduction of the oxidant to a flame. The method 700 begins at block 702, with the injection of an oxidant into an oxidant injection port on a combustor. The oxidant is either separated from other materials or blended with a fuel just prior to injection into a flame. At block 704, the fuel is injected into a fuel injection port on the combustor substantially simultaneously to the oxidant injection. At block 706, a recycle gas is injected into a third port on the combustor.

At block 708, the fuel and oxidant are combusted, for example, in a combustion can as described herein. The recycle gas flows around the combustion can, providing cooling for the combustion can. A portion of the recycle gas enters the combustion can through perforations, cooling and diluting the hot exhaust gas.

At block 710, the hot exhaust gas from the flame is allowed to expand in a turbine expander, generating mechanical energy to turn a shaft. The mechanical energy may be used to power compressors, such as the inlet compressor, among others, or to power an electrical generator. At block 712, heat may be removed from the exhaust gas, for example, in a heat recovery unit such as a heat recovery steam generator (HRSG), or in heating the oxidant or fuel. After any heat recovery, at block 714, the exhaust gas may be cooled and compressed, for example, in the compressor section of the turbine, for use as the recycle gas.

At block 716, the remaining portion of the recycle gas is removed through a recycle-gas extraction port on the combustor. At block 718, heat is extracted from the hot recycle gas, for example, by a chiller, a heat exchanger, or in a heat recovery unit. At block 720, $CO_2$ can be extracted from the recycle gas for various purposes, including enhanced oil recovery or carbon sequestration. The uses of the $CO_2$ are not limited to these uses, as the $CO_2$ may be compressed and sold as a product or may be used in chemical reactions to reform hydrocarbons. After the extraction of the $CO_2$ the remaining gas will be substantially nitrogen. The nitrogen may be compressed to use as for pressure maintenance of vessels or oil reservoirs or may be expanded to use as a vent gas, for example, to convey combustible gases in a flare system to the flare for burning. Further, the $CO_2$ may be sold for other purposes. To enhance the amount of $CO_2$ in the recycle gas, and to minimize $O_2$ and CO contamination of the exhaust gas, the stoichiometry of the burn may be controlled, as discussed below.

Control of Combustion Parameters

In embodiments of the present techniques, the spool piece described herein may be used in conjunction with techniques for controlling the stoichiometry of the combustion process to enhance the amount of $CO_2$ that may be recovered from the recycle gas. The combustion process in the combustors 110 may be controlled both as a group and individually. The control may assist in balancing the equivalence ratio of the fuel and oxygen, which may lower unburned or partially burned hydrocarbon, represented by the CO concentration in an exhaust stream and to minimize unconsumed oxygen in the exhaust stream. The equivalence ratio is discussed further with respect to FIG. 8.

Figure 8A:
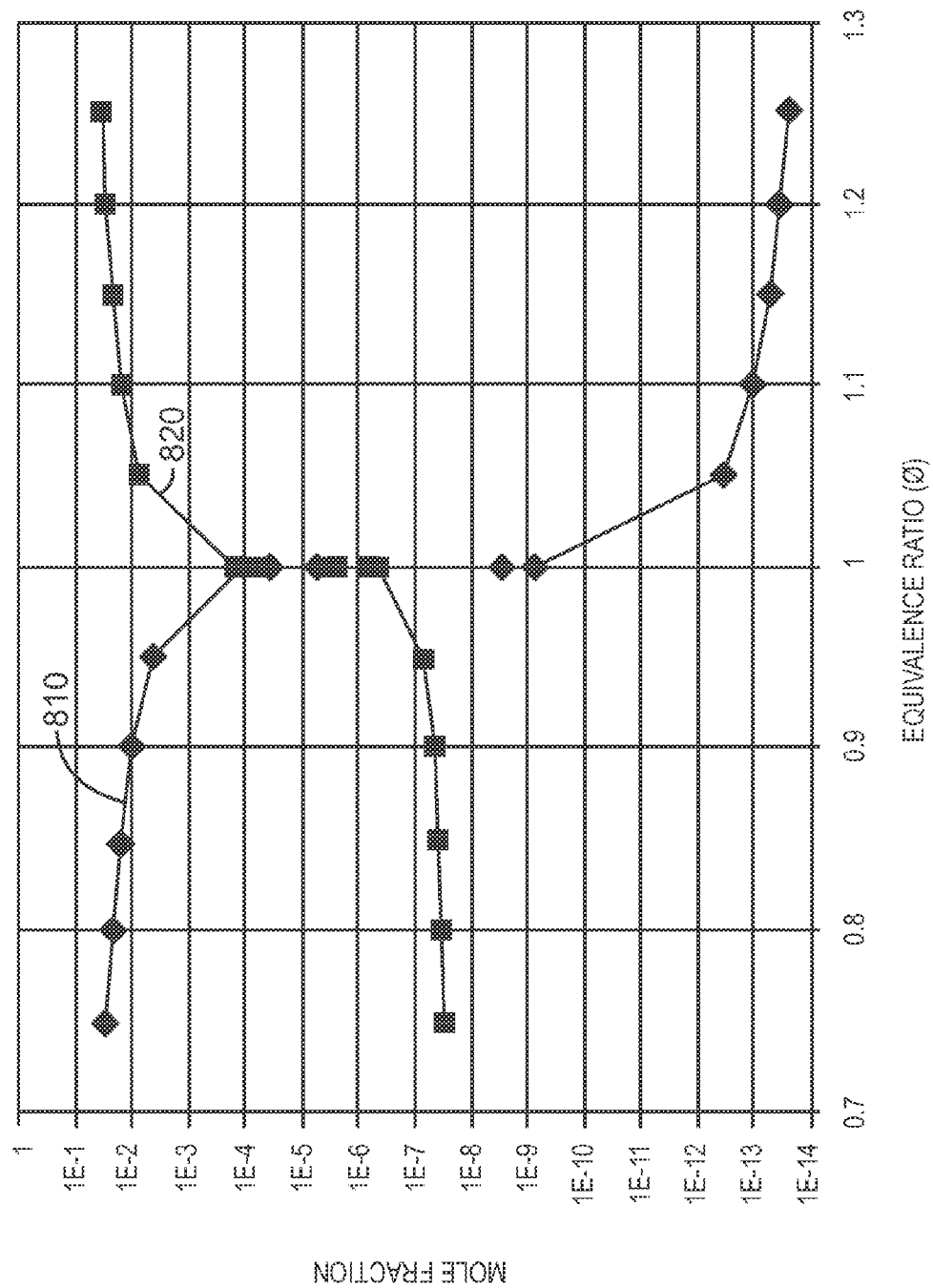
FIGS. 8A and 8B are graphical depictions of a simulation showing the relationship between the concentration of oxygen and carbon monoxide as the equivalence ratio ($\phi$) changes from 0.75 to 1.25 and from 0.999 to 1.001, respectively.
Figure 8B:
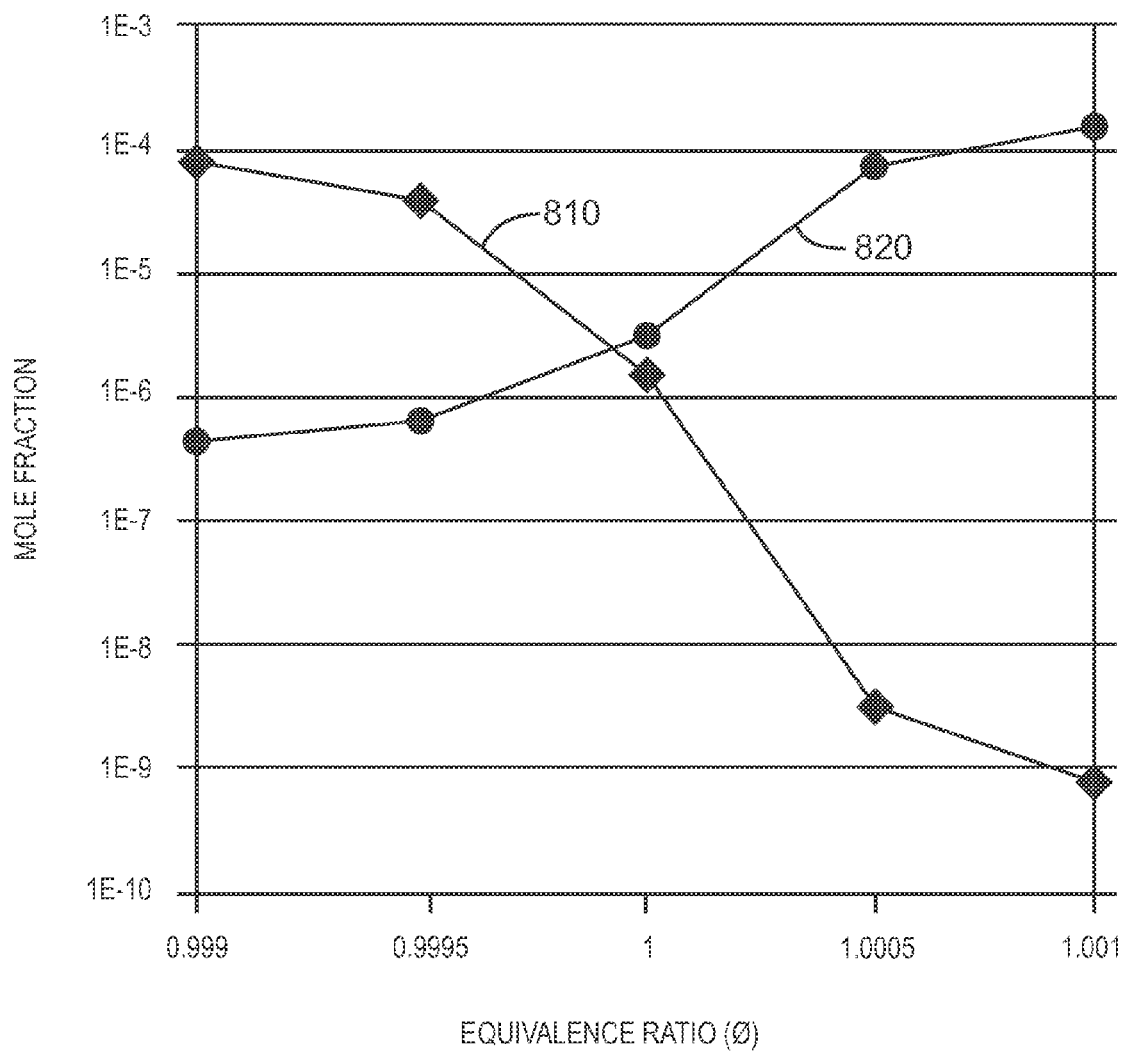

FIGS. 8A and 8B are graphical depictions of a simulation showing the relationship between the concentration of oxygen and carbon monoxide as the equivalence ratio ($\phi$) changes from 0.75 to 1.25 and from 0.999 to 1.001, respectively. The oxygen concentration as a function of the equivalence ratio is shown as line 810 and the carbon monoxide concentration as a function of the equivalence ration is shown as line 820. The equivalence ratio ($\phi$) is equal to (mol % fuel/mol % oxygen)$_{actual}$/(mol % fuel/mol % oxygen)$_{stoichiometric}$. The mol % fuel is equal to $F_{fuel}/(F_{oxygen}+F_{fuel})$, where $F_{fuel}$ is equal to the molar flow rate of fuel and $F_{oxygen}$ is equal to the molar flow rate of oxygen.

The mol % oxygen is equal to $F_{oxygen}/(F_{oxygen}+F_{fuel})$, where $F_{oxygen}$ is equal to the molar flow rate of oxygen and $F_{fuel}$ is equal to the molar flow rate of fuel. The molar flow rate of the oxygen depends on the proportion of oxygen to diluent in the oxidant mixture, and may be calculated as $F_{oxygen}/(F_{oxygen}+F_{diluent})$. As used herein, the flow rate of the oxidant may be represented as $F_{oxidant}=(F_{oxygen}+F_{diluent})$.

As the equivalence ratio ($\phi$) goes below 1 or above 1 the mole fraction or concentration of oxygen and carbon dioxide in the exhaust gas change. For example, as the equivalence ratio ($\phi$) goes below 1 the mole fraction of oxygen rapidly increases from about 1 ppm (i.e., an oxygen mole fraction of about $1.0 \times 10^{-6}$) at an equivalence ratio ($\phi$) of about 1 to about 100 ppm (i.e., an oxygen mole fraction of about $1 \times 10^{-4}$) at an equivalence ratio of about 0.999. Similarly, as the equivalence ratio ($\phi$) goes above 1 the concentration of carbon monoxide rapidly increase from about 1 ppm (i.e., carbon monoxide mole fraction of about $1 \times 10^{-6}$) at an equivalence ratio ($\phi$) of about 0.9995 to greater than about 100 ppm (i.e., a carbon monoxide mole fraction of about $1 \times 10^{-4}$) at an equivalence ratio ($\phi$) of about 1.001.

Based, at least in part, on data obtained from sensors that may be placed on an expander exhaust section after the turbine expander 106 (FIG. 1) or on the exhaust line 112 from each combustor 110 to the turbine expander 106, among others, the amount of oxidant 116 and/or the amount of fuel 114 to each of the combustors 110 can be adjusted to produce an exhaust gas having a desired composition. For example, monitoring the oxygen and/or carbon monoxide concentration in the exhaust gas may allow the individual adjustment of the amount of oxidant 116 and fuel 114 introduced to each combustor 110 to be controlled such that combustion of the fuel is carried out within a predetermined range of equivalence ratios ($\phi$) in that combustor 110. This can be used to produce an exhaust gas having a combined concentration of oxygen and carbon monoxide of less than about 3 mol %, less than about 2.5 mol %, less than about 2 mol %, less than about 1.5 mol %, less than about 1 mol %, or less than about 0.5 mol %. Furthermore, the exhaust gas may have less than about 4,000 ppm, less than about 2,000 ppm, less than about 1,000 ppm, less than about 500 ppm, less than about 250 ppm, or less than about 100 ppm combined oxygen and carbon monoxide.

A desired or predetermined range for the equivalence ratio ($\phi$) in each combustor 110 can be calculated or entered to carry out the combustion of the fuel 114 to produce an mixed exhaust gas containing a desired amount of oxygen and/or carbon monoxide. For example, the equivalence ratio ($\phi$) in each combustor 110 can be maintained within a predetermined range of from about 0.85 to about 1.15 to produce an exhaust gas having a combined oxygen and carbon monoxide concentration ranging from a low of about 0.5 mol %, about 0.8 mol %, or about 1 mol %, to a high of about 1.5 mol %, about 1.8 mol %, about 2 mol %, or about 2.2 mol %. In another example, the equivalence ratio ($\phi$) in each of the combustors 110 can be maintained within a range of about 0.85 to about 1.15 to produce an exhaust gas having a combined oxygen and carbon monoxide concentration of less than 2 mol %, less than about 1.9 mol %, less than about 1.7 mol %, less than about 1.4 mol %, less than about 1.2 mol %, or less than about 1 mol %. In still another example, the equivalence ratio ($\phi$) in each of the combustors 110 can be maintained within a range of from about 0.96 to about 1.04 to produce an exhaust gas having a combined oxygen and carbon monoxide concentration of less than about 4,000 ppm, less than about 3,000 ppm, less than about 2,000 ppm, less than about 1,000 ppm, less than about 500 ppm, less than about 250 ppm, or less than about 100 ppm.

It will be noted that the combustors 110 do not have to be at the same set-point, or even within the same range. In embodiments of the present techniques, different or biased set-points may be used for each of the combustors 110 to account for differences in construction, performance, or operation. This may avoid a situation in which different operational characteristics of different combustors 110 cause the exhaust gas to be contaminated with unacceptable levels of oxygen or carbon monoxide.

Accordingly, in embodiments of the present techniques, two methods for operating the gas turbine 102 may be used. In a first method, the entire set of combustors 110 is operated as a single entity, for example, during startup and in response to global set-point adjustments, such as speed or power changes. In a second method, the individual combustors 110 may be separately biased, for example, to compensate for differences in wear, manufacturing, and the like.

One method for operating the entire set of combustors 110 can include initially, i.e., on start-up, introducing the fuel 114 and oxygen in the oxidant 116 at an equivalence ratio greater than 1. For example, the equivalence ratio ($\phi$) at startup may range from a low of about 1.0001, about 1.0005, about 1.001, about 1.05, or about 1.1, to a high of about 1.1, about 1.2, about 1.3, about 1.4, or about 1.5. In another example, the equivalence ratio ($\phi$) can range from about 1.0001 to about 1.1, from about 1.0005 to about 1.01, from about 1.0007 to about 1.005, or from about 1.01 to about 1.1. For global adjustments, the concentration of oxygen and/or carbon monoxide in the exhaust gas can be determined or estimated via exhaust gas sensors. The expanded exhaust gas in the exhaust gas may initially have a high concentration of carbon monoxide (e.g., greater than about 1,000 ppm or greater than about 10,000 ppm) and a low concentration of oxygen (e.g., less than about 10 ppm or less than about 1 ppm).

Another method for operating the entire set of combustors 110 can include initially, i.e., on start-up, introducing the fuel 114 and oxygen in the oxidant 116 at an equivalence ratio of less than 1. For example, the equivalence ratio ($\phi$) at startup may range from a low of about 0.5, about 0.6, about 0.7, about 0.8, or about 0.9 to a high of about 0.95, about 0.98, about 0.99, about 0.999. In another example, the equivalence ratio ($\phi$) can range from about 0.9 to about 0.999 from about 0.95 to about 0.99, from about 0.96 to about 0.99, or from about 0.97 to about 0.99. The exhaust gas can initially have a high concentration of oxygen (e.g., greater than about 1,000 ppm or greater than about 10,000 ppm) and a low concentration of carbon monoxide (e.g., less than about 10 ppm or even less than about 1 ppm).

For example, when the concentration of oxygen in the exhaust gas increases from less than about 1 ppm to greater than about 100 ppm, about 1,000 ppm, about 1 mol %, about 2 mol %, about 3 mol %, or about 4 mol %, an operator, a control system, or both can be alerted that an equivalence ratio ($\phi$) of less than 1 has been reached. In one or more embodiments, the amount of oxygen via oxidant 116 and fuel 114 can be maintained constant or substantially constant to provide a combustion process having an equivalence ratio ($\phi$) of slightly less than 1, e.g., about 0.99. The amount of oxygen via oxidant 116 can be decreased and/or the amount of fuel 114 can be increased and then maintained at a constant or substantially constant amount to provide a combustion process having an equivalence ratio ($\phi$) falling within a predetermined range. For example, when the concentration of oxygen in the exhaust gas increases from less than about 1 ppm to about 1,000 ppm, about 0.5 mol %, about 2 mol %, or about 4 mol %, the amount of oxygen introduced via the oxidant 116 can be reduced by an amount ranging from a low of about 0.01%, about 0.02%, about 0.03%, or about 0.04 to a high of about 1%, about 2%, about 3%, or about 5% relative to the amount of oxygen introduced via the oxidant 116 at the time the increase in oxygen in the exhaust gas is initially detected. In another example, when the concentration of oxygen in the exhaust gas increases from less than about 1 ppm to about 1,000 ppm or more the amount of oxygen introduced via the oxidant 116 can be reduced by about 0.01% to about 2%, about 0.03% to about 1%, or about 0.05% to about 0.5% relative to the amount of oxygen introduced via the oxidant 116 at the time the increase in oxygen in the exhaust gas is detected. In still another example, when the concentration of oxygen increases from less than about 1 ppm to about 1,000 ppm or more the amount of fuel 114 can be increased by an amount ranging from a low of about 0.01%, about 0.02%, about 0.03%, or about 0.04 to a high of about 1%, about 2%, about 3%, or about 5% relative to the amount of fuel 114 introduced at the time the increase in oxygen in the exhaust gas is initially detected.

During operation of the gas turbine 102, the equivalence ratio ($\phi$) can be monitored via sensors on a continuous basis, at periodic time intervals, at random or non-periodic time intervals, when one or more changes to the gas turbine 102 occur that could alter or change the equivalence ratio ($\phi$) of the exhaust gas, or any combination thereof. For example, changes that could occur to the gas turbine 102 that could alter or change the equivalence ratio ($\phi$) can include a change in the composition of the fuel, a change in the composition of the oxidant, or a combination thereof. As such, the concentration of oxygen and/or carbon monoxide, for example, can be monitored, and adjustments can be made to the amount of oxidant 116 and/or fuel 114 to control the amounts of oxygen and/or carbon monoxide in the exhaust gas.

In at least one embodiment, reducing the equivalence ratio ($\phi$) can be carried out in incremental steps, non-incremental steps, a continuous manner, or any combination thereof. For example, the amount of oxidant 116 and/or the fuel 114 can be adjusted such that the equivalence ratio ($\phi$) changes by a fixed or substantially fixed amount per adjustment to the oxidant 116 and/or fuel 114, e.g., by about 0.001, by about 0.01, or by about 0.05. In another example, the amount of oxidant 116 and/or fuel 114 can be continuously altered such that the equivalence ratio continuously changes. Preferably the amount of oxidant 116 and/or fuel 114 is altered and combustion is carried out for a period of time sufficient to produce an exhaust gas of substantially consistent composition, at which time the amount of oxidant 116 and/or fuel 114 can be adjusted to change the equivalence ratio ($\phi$) in an amount ranging form a low of about 0.00001, about 0.0001, or about 0.0005 to a high of about 0.001, about 0.01, or about 0.05. After the exhaust gas achieves a substantially consistent concentration of oxygen the oxidant 116 and/or fuel 114 can again be adjusted such that the equivalence ratio ($\phi$) changes. The amount of oxygen and/or carbon monoxide in the exhaust gas can be monitored and the amount of oxidant 116 and/or fuel 114 can be repeatedly adjusted until the exhaust gas has a combined concentration of oxygen and carbon monoxide, for example, of less than about 2 mol % or less than about 1.5 mol %, or less than about 1 mol %.

The combustors 110 can be operated on a continuous basis such that the exhaust gas has a combined oxygen and carbon monoxide concentration of less than 2 mol %, less than 1 mol %, less than 0.5 mol %, or less than about 0.1 mol %. In another example, the time during which combustion is carried out within the combustors 110, the exhaust gas can have a combined oxygen and carbon monoxide concentration of less than 2 mol % or less than about 1 mol % for about 50%, 55%, 60%, 65%, 70%, 75%, 80%, 85%, 90%, or about 95% of the time during which the gas turbine 102 is operated. In other words, for a majority of the time that combustion is carried out within the combustors 110, the exhaust gas can have a combined oxygen and carbon monoxide concentration of less than about 2 mol %, less than about 1 mol %, less than about 0.5 mol %, or less than about 0.1 mol %.

Once the overall control of the gas turbine 102 is set, the biasing needed for individual combustors 110 may be determined in the second method. For example, an oxidant flow adjusting device for each individual combustor 110 can be adjusted by a control system to maintain a measured value from sensors at or near to a desired set-point. Several calculated values may be determined from measured values from the sensors. These may include, for example, an average value that can be used to make similar adjustments to all of the oxidant flow adjusting devices in the combustors, as discussed with respect to the first method.

In addition, various difference values, for example, calculated based on differences of the measured values of two or more sensors, may be used to make biasing adjustments to the oxidant flow adjusting devices on one or more of the combustors to minimize differences between the measured values of the sensors. A control system may also adjust the oxidant 116 directly, such by adjusting compressor inlet guide vanes (IGV), or a speed control to change the oxidant flow rates, for example, to all of the combustors 110 at once. Further, the control system can make similar adjustments to the fuel 114 to all combustors 110, depending, for example, on the speed selected for the gas turbine 102. As for the oxidant, the fuel supply to each of the combustors 110 may be individually biased to control the equivalence ratio of the burn.

The second method may be used for biasing individual combustors 110 based on readings from an array of sensors. It can be assumed that the gas turbine 102 has been started before this method begins, and that all of the combustors 110 are using essentially the same mixture or a previous operation point. The method begins by obtaining readings from sensors in the exhaust. Sums and differences may be determined between the measurements obtained from the individual sensors. The sums and differences may be combined to assist in identifying the combustors 110 that are contributing to a high oxygen or high carbon monoxide condition in the exhaust. Further, this may also be performed by using a swirl chart, which maps which combustors 110 affect a reading at a particular sensor. Adjustments to the fuel 114 and oxidant 116 for the identified combustors 110 are calculated, for example, using the same considerations as used for adjusting all of the combustors 110 in the first method. The new set-point for the oxidant 116 is entered and oxidant is provided to the combustors 110. In a substantially simultaneous manner, a new set-point is entered for the fuel 114, and fuel 114 is provided to the combustors 110. The combustion process consumed the fuel 114 and oxidant 116 provided. The method is continuously performed during operations to ensure that the exhaust gas maintains the composition.

More precise measurements may be used to provide finer control over the combustion process. For example, each combustor 110 may have a separate sensor located on an exhaust line 112 from the combustor 110. In these embodiments, the effects of changes to individual combustors 110 may be made, and a precise adjustment to the oxidant 116 and fuel 114 may be made for any combustor 110 contributing too much oxygen or carbon monoxide to the exhaust, for example, using the techniques discussed with respect to the first method. These adjustments may be made in addition to any uniform adjustments made in the entire set of combustors 110, for example, in response to a set-point change in the operating speed of the gas turbine 102.

While the present techniques may be susceptible to various modifications and alternative forms, the exemplary embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:
1. A gas turbine combustor, comprising:
   a combustor comprising a partially perforated combustion liner;
   an oxidant injection port configured for injection of an oxidant through the partially perforated combustion liner such that the oxidant is injected proximate to a flame in the combustor;
   a recycle-gas extraction port configured for an extraction of a recycle gas from the combustor, wherein the partially perforated combustion liner allows a portion of the recycle gas to mix with at least a portion of an exhaust gas; and
   a barrier to prevent mixing of the recycle gas and the oxidant prior to introduction of the oxidant through the partially perforated combustion liner.

2. The gas turbine combustor of claim 1, comprising an injection lance configured to inject the oxidant directly into the flame.

3. The gas turbine combustor of claim 1, wherein the oxidant comprises a mixture of oxygen and a diluent gas.

4. The gas turbine combustor of claim 1, further comprising a swirler configured to create a spiral flow in the oxidant to enhance mixing with a fuel.

5. The gas turbine combustor of claim 1, wherein the combustor comprising a partially perforated combustion liner is configured to replace a preexiting combustor.

6. A method for operating a gas turbine engine, comprising:
- injecting an oxidant into an oxidant injection port on a combustor, wherein the combustor is configured to convey the oxidant to a flame in the combustor to form an exhaust gas;
- cooling a portion of the exhaust gas from the gas turbine engine to form a cooled exhaust gas;
- compressing the cooled exhaust gas to form a recycle gas;
- flowing the recycle gas around a perforated combustion can disposed around the flame to cool the perforated combustion can and form a hot recycle gas, wherein the oxidant and the recycle gas are prevented from mixing by a barrier prior to introduction of the oxidant through the perforated combustion can;
- flowing at least a portion of the recycle gas through the perforated combustion can to mix with the exhaust gas; and
- removing a portion of the hot recycle gas through a recycle-gas extraction port on the combustor.

7. The method of claim 6, further comprising compressing the recycle gas in the compressor section of the gas turbine engine prior to injecting the recycle gas into the combustor.

8. The method of claim 6, further comprising compressing the oxidant in a compressor external to the gas turbine engine.

9. The method of claim 6, further comprising cooling the recycle gas in a direct contact cooler.

10. The method of claim 6, further comprising transferring heat energy from the hot recycle gas to the oxidant, or to a fuel, or to both, prior to their injection into the combustor.

11. The method of claim 6, further comprising controlling an injection of the oxidant, a fuel, or both, to all combustors to adjust a composition of the exhaust gas.

12. The method of claim 6, further comprising individually controlling an injection of the oxidant, a fuel, or both, to each of a plurality of combustors to adjust a composition of the exhaust gas.

13. The method of claim 6, further comprising:
- cooling the hot recycle gas to form a cooled recycle gas; and
- separating carbon dioxide from the cooled recycle gas.

14. A gas turbine system, comprising:
- a combustor, comprising:
  - a recycle gas port configured for an injection of a recycle gas for cooling the combustor;
  - an oxidant injection port configured for an injection of an oxidant proximate to a flame in the combustor;
  - a partially perforated combustion liner for allowing at least a portion of the recycle gas to mix with at least a portion of an exhaust gas; and
  - a recycle-gas extraction port configured for an extraction of the recycle gas from the combustor, wherein a barrier prevents mixing of the recycle gas and the oxidant prior to introduction of the oxidant through the partially perforated combustion liner.

15. The gas turbine system of claim 14, further comprising:
- a compressor; and
- a turbine expander, wherein the compressor and turbine expander are mechanically coupled so that mechanical energy is transferred from the turbine expander to the compressor.

16. The gas turbine system of claim 14, further comprising a carbon dioxide removal system.

17. The gas turbine system of claim 14, further comprising a heat recovery unit configured to harvest energy from the exhaust gas from the gas turbine system.

18. The gas turbine system of claim 17, wherein the heat recovery unit comprises a heat recovery steam generator.

19. The gas turbine system of claim 17, comprising a turbine driven by energy recovered from the heat recovery unit.

20. The gas turbine system of claim 14, further comprising a heat exchanger configured to heat the oxidant with heat recovered from the recycle gas extracted from the combustor.

21. The gas turbine system of claim 14, further comprising a heat exchanger configured to heat a fuel with heat recovered from the recycle gas extracted from the combustor.

* * * * *